United States Patent
Bauman et al.

(10) Patent No.: US 10,935,780 B2
(45) Date of Patent: Mar. 2, 2021

(54) INTEGRATED TELESCOPE FOR IMAGING APPLICATIONS

(71) Applicant: Lawrence Livermore National Security, LLC, Livermore, CA (US)

(72) Inventors: Brian Bauman, Livermore, CA (US); Alexander Pertica, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 245 days.

(21) Appl. No.: 16/152,150

(22) Filed: Oct. 4, 2018

(65) Prior Publication Data
US 2020/0110255 A1    Apr. 9, 2020

(51) Int. Cl.
G02B 23/02    (2006.01)
G02B 23/06    (2006.01)
H04N 5/33    (2006.01)

(52) U.S. Cl.
CPC ............... *G02B 23/06* (2013.01); *H04N 5/33* (2013.01)

(58) Field of Classification Search
CPC .......... G02B 23/06; G02B 23/00; H04N 5/33; G01B 9/06
USPC ....................................................... 359/399
See application file for complete search history.

(56) References Cited

U.S. PATENT DOCUMENTS

| | | | |
|---|---|---|---|
| 2,670,656 A | 3/1954 | Braymer | |
| 3,064,526 A * | 11/1962 | Lindsay | G02B 15/00 359/503 |
| 4,619,502 A | 10/1986 | Bagby | |
| 5,149,970 A | 9/1992 | Whitney | |
| 5,471,346 A | 11/1995 | Ames | |
| 6,061,175 A | 5/2000 | Watters | |
| 7,843,650 B1 | 11/2010 | Roberts | |
| 9,720,223 B2 * | 8/2017 | Riot | G02B 23/02 |
| 2006/0132908 A1 | 6/2006 | Baun et al. | |
| 2009/0268983 A1 | 10/2009 | Stone et al. | |
| 2010/0091396 A1 | 4/2010 | Hutson et al. | |
| 2014/0198222 A1 | 7/2014 | Blanc et al. | |

OTHER PUBLICATIONS

Caden, E., "Studying neutrino directionality with double chooz," presentation at Applied Antineutrino Physics (AAP) Conference in Honolulu, HI (2012).
Cherepy, N. et al., "Bismuth- and lithium-loaded plastic scintillators for gamma and neutron detection," Nuclear Instruments and Methods in Physics Research Section A: Accelerators, Spectrometers, Detectors and Associated Equipment, vol. 778, Apr. 1, 2015, pp. 126-132.

* cited by examiner

*Primary Examiner* — Bumsuk Won
*Assistant Examiner* — Henry A Duong
(74) *Attorney, Agent, or Firm* — Perkins Coie LLP

(57) ABSTRACT

Integrated telescopes are described that are stable and compact, and include optics pieces that are susceptible to stray light. One example telescope includes an optics piece formed of a transparent optical material and two surfaces with each surface including a reflector surface and a baffle. The baffles may be formed in a groove in one of the surfaces of the optics piece. The baffle may have an index of refraction that is approximately the same as an index of refraction of the optics piece. The baffle may include a blackened epoxy, a carbon black material, or a powdered black spinel. The integrated telescope may include a shortwave infrared image sensor fixed in position relative to the optics piece.

30 Claims, 17 Drawing Sheets

INTEGRATED TELESCOPE FOR IMAGING APPLICATIONS

STATEMENT REGARDING FEDERALLY SPONSORED RESEARCH OR DEVELOPMENT

The United States Government has rights in this invention pursuant to Contract No. DEAC52-07NA27344 between the United States Department of Energy and Lawrence Livermore National Security, LLC for the operation of Lawrence Livermore National Laboratory.

TECHNICAL FIELD

This patent document relates to telescopes, and systems and devices that use telescopes for capturing images.

BACKGROUND

Telescopes are well known optical instruments and have important applications in a wide range of uses. Classic telescope designs include Mersenne designs and Cassegrain designs based on folded optical configurations using reflective mirrors.

SUMMARY

The telescope technology disclosed in this patent document can be implemented to construct an integrated telescope package by permanently fixing optical components of the telescope at predefined positions without having movable or adjustable components in the optical layout of the telescope to improve immunity to vibrations and other perturbations and to maintain stability of the optical alignment. In addition, a baffle structure for reducing background light can be integrated in an optical assembly to improve the imaging performance. In some embodiments, a Short-Wave Infrared (SWIR) image sensor can be used with the disclosed telescope technology for imaging applications.

In one aspect, the disclosed technology can be implemented to provide a telescope by including an optics piece, a correction lens, and an image sensor. The optics piece formed of a transparent optical material and including a first surface and a second surface opposing the first surface. The first surface includes a convex reflector surface within a central region of the optics piece and a peripheral ring shaped region that surrounds the central region for receiving input light received by the telescope. The second surface includes a cylindrical groove and a concave reflector surface located in a peripheral region surrounding the cylindrical groove, the cylindrical groove structured to have a predetermined depth, to include a baffle and to extend towards the first surface in the central region of the optics piece. The convex reflector surface of the first surface and the concave reflector surface of the second surface are configured to collectively form an optical telescope that directs the input light received by the peripheral ring shaped region of the first surface along a folded optical path between the first surface and the second surface to pass within the cylindrical groove of the second surface. A correction lens located adjacent to the cylindrical groove of the second surface to receive output light from the cylindrical groove. An image sensor fixed in position relative to the second surface of the optics piece at a focal plane of the optical telescope to receive and detect output light from the correction lens.

In some embodiments, the baffle has an index of refraction that is approximately the same as an index of refraction of the optics piece. In some embodiments, the baffle includes a blackened epoxy, a carbon black material, or a powdered black spinel. The powdered black spinel may include a manganese ferrite black material.

In some embodiments, the disclosed telescope may also include one or more rings on a portion of the convex reflector surface of the first surface, where the one or more rings may be black. In some other embodiments, the disclosed telescope may also include multiple rings formed on a portion of the convex reflector surface of the first surface and arranged in a concentric pattern.

In some embodiments, the disclosed telescope may also include one or more rings on a portion of the concave reflector surface of the second surface, where the one or more rings may be black. In some other embodiments, the disclosed telescope may also include multiple rings formed on a portion of the concave reflector surface of the second surface and arranged in a concentric pattern.

In another aspect, the disclosed technology can be implemented to provide a method for adding a baffle to an optical component. The method includes positioning an optics piece such that a first surface of the optics piece faces away from a hole cutting device and a second surface of the optics piece faces towards the hole cutting device. The method also includes creating a cylindrical groove in a central region of the second surface of the optics piece by plunging the hole cutting device into the optics piece to a predetermined depth. Additionally, the method comprises filling the cylindrical groove with a material to form a baffle. Furthermore, the method comprises placing one or more ring shaped masks over a portion of a convex reflector surface of the first surface, depositing reflective coating on the first surface of the optics piece, removing the one or more ring shaped masks from the convex reflector surface of the first surface to expose the one or more ring regions without the reflective coating, and applying a black material to the one or more rings regions.

In some embodiments, the cylindrical groove is filled from bottom of the cylindrical groove with a vibrating syringe to avoid air bubbles. In some embodiments, the black material applied to the one or more rings regions has an index of refraction that is approximately same as an index of refraction as the optics piece. In some embodiments, the black material applied to the one or more rings regions includes a carbon black material or a powdered black spinel.

The exemplary method may further include placing one or more ring shaped masks over a portion of a concave reflector surface of the second surface, depositing reflective coating on the second surface of the optics piece, removing the one or more ring shaped masks from the concave reflector surface of the second surface to expose the one or more ring regions without the reflective coating, and applying a black material to the one or more rings regions.

In another aspect, the disclosed technology can be implemented to provide an integrated telescope to include an optics piece, a correction lens, and an image sensor. The optics piece formed of a transparent optical material and including a first surface and a second surface opposing the first surface. The first surface includes a convex reflector surface within a central region of the optics piece and a peripheral ring shaped region that surrounds the central region to receive input light received by the telescope. The convex reflector surface of the first surface and a concave reflector surface of the second surface are configured to collectively form an optical telescope that directs the input light received by the peripheral ring shaped region in the first surface along a folded optical path between the first surface and the second surface. A correction lens is located adjacent to the second surface to receive output light from the optics piece to apply an optical correction thereto. The optics piece is structured to include an internal optical baffle located inside the optics piece in the folded optical path between the first surface and the second surface to reduce scattered background light in the output light received by the correction lens.

In some embodiments, the internal optical baffle includes a cylindrical structure in the folded optical path near the second surface to allow light to pass within the cylindrical structure towards the correction lens while blocking light that hits a side of the cylindrical structure. In some embodiments, the internal optical baffle is optically absorptive, optically retro-reflective, or optically diffractive. The optically diffractive internal optical baffle may include a grooved structure.

In some embodiments, the internal optical baffle has an index of refraction that is approximately same as an index of refraction of the optics piece. In some embodiments, the internal optical baffle includes a blackened epoxy, a carbon black material, or a powdered black spinel.

In some embodiments, the exemplary telescope further includes a short-wave infrared image sensor fixed in position relative to the second surface of the optics piece at a focal plane of the optical telescope to receive and detect output light from the correction lens. In embodiments where the telescope includes a short-wave infrared image sensor, the convex and concave reflector surfaces are coated with a metallic coating or a dielectric multi-layer coating. In some embodiments, the short-wave infrared image sensor is configured to receive light having wavelength from 900 nm to 1700 nm.

These and other aspects and features are described in greater detail in the drawings, the description and the claims.

DETAILED DESCRIPTION

Figure 1:
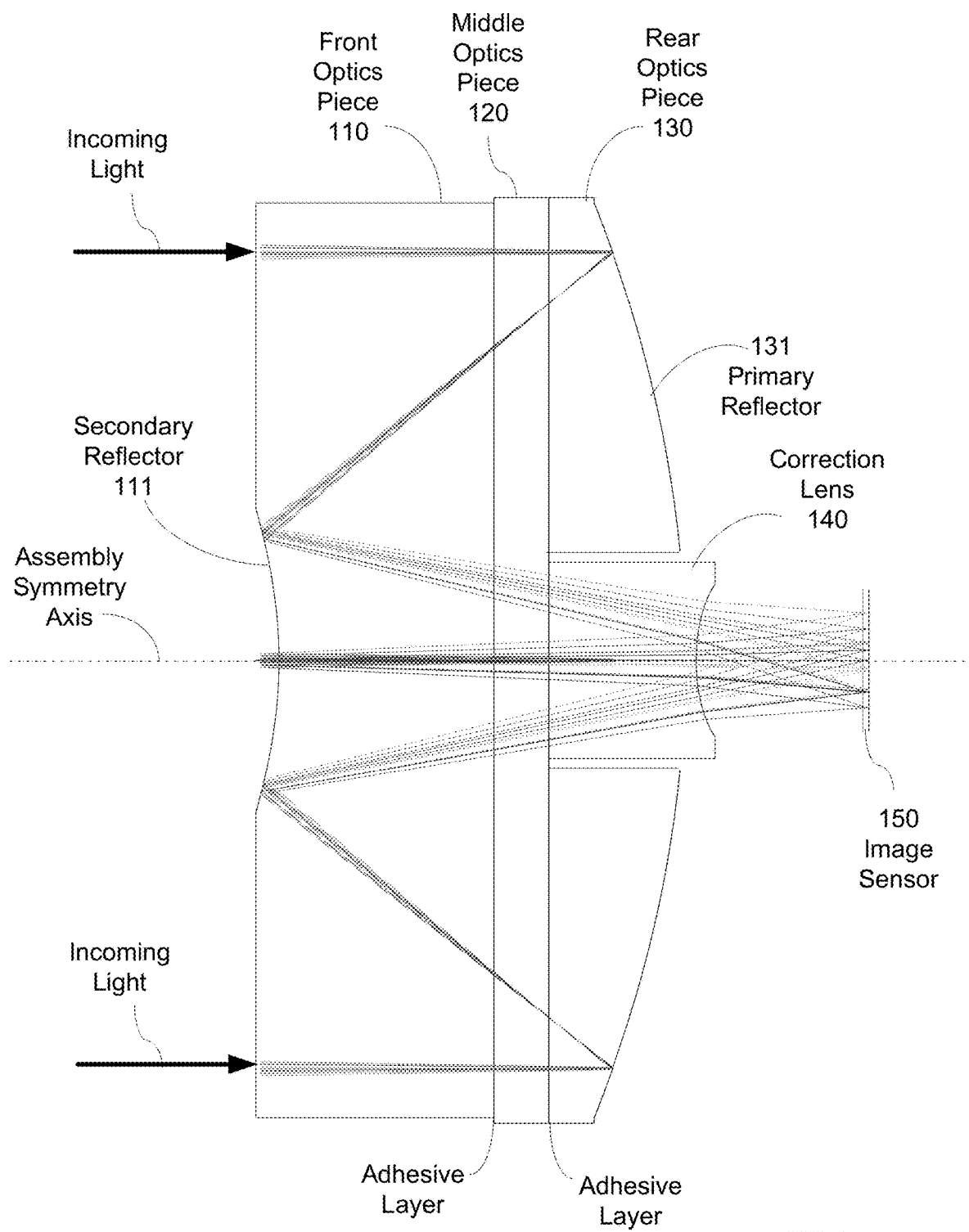
FIGS. 1, 2 and 3 illustrate examples of integrated telescope assemblies by permanently fixing optical components at predefined positions without having movable or adjustable components to improve immunity to vibrations and other perturbations and operational reliability.

In various telescope designs using reflective mirrors, the reflective mirrors are mounted at different locations relative to one another and are optically aligned in specific ways to achieve the desired optical alignment for the different reflective mirrors for proper operation of the telescopes. In general, the optical alignment of such telescopes tends to be vulnerable to vibrations, motions and other perturbations.

For example, one of the critical parameters of a telescope is the distance between the primary and secondary mirrors which is highly sensitive to perturbations. Various complex active telescope control mechanisms have been developed to provide active mirror steering or adjustment to allow for adjustment of mirror positions and re-alignment of the mirrors in a telescope. For applications where a telescope is in a vibrating environment or on a moving platform such as a vehicle, a boat, an airplane or satellite, active mirror steering or adjustment may not be sufficient to maintain desired optical alignment of a telescope. For example, the launch of a satellite or space shuttle generates violent vibrations and strong mechanical forces that can adversely change the optical alignment of delicate optical instruments such as telescopes.

Automatic re-alignment of optical mirrors in telescopes without human intervention may be possible by complex active telescope control mechanisms but such automatic alignment is subject to failure and often requires human intervention. For space-borne platforms such as satellites or unmanned space stations, failure in optical alignment on telescopes presents a serious challenge to space missions. Therefore, there is a need for telescope designs that can withstand perturbations without needing re-alignment of the optical components of telescopes.

In another aspect, there is a need for compact and lightweight telescopes in a wide range of applications, including satellite applications, small space station missions and other applications. Conventional telescopes based on reflective mirrors such as Mersenne or Cassegrain type telescopes tend to be difficult to be compact due to the tight tolerances of their designs.

One of the technical issues in operating telescopes of various types is that scattered light from the background can be significant relative to the useful light received by the telescope for imaging a desired target object or area. The scattered light from the background can adversely affect or wash out the imaging contrast of the target imaging collected by the telescope. For example, a telescope on a satellite or aircraft can be subject to strong background light caused by the sunlight. The technology disclosed in this document provides different baffle designs to mitigate such undesired background light. In some implementations, a baffle can be structured to include a housing in which the integrated telescope unit is enclosed to block light from reaching the image sensor other than the light directly received by the front optics piece. In other implementations, a baffle structure for reducing the background light can be built into the optical components within the integrated telescope unit.

The telescopes described here can be configured in an integrated telescope package by permanently fixing optical components of the telescope at predefined positions without having movable or adjustable components in the optical layout of the telescope to improve immunity to vibrations and other perturbations and to maintain stability of the optical alignment. In examples described below, such an integrated telescope assembly includes front, middle and rear optics pieces of a transparent material, a correction lens and an image sensor that are permanently fixed in position relative to one another in an integrated packaging. All optical components such as the primary and secondary reflectors of the telescope and the image sensor are formed on or attached to the front, middle and rear optics pieces. In other examples described below, such an integrated telescope assembly includes a single optical piece of a transparent material, a correction lens and an image sensor that are permanently fixed in position relative to one another in an integrated packaging. Once the assembly is fully assembled, the telescope is fixed in its configuration with desired optical alignment and there is no movable or adjustable component in the optical layout of the telescope. No further optical alignment is needed. In addition, such an integrated telescope assembly with fixed optical components can use folded optical paths to reduce the overall physical dimension of the telescope while achieving desired optical performance comparable to or exceeding larger telescopes in other designs.

While the integrated telescopes are stable and have a compact size, the integrated telescopes can suffer from stray light. For example, a solid glass optical piece with a primary and secondary mirror includes a front surface that can scatter light. The solid glass construction of the optical piece precludes the use of a baffle between the primary and secondary mirror. Such a baffle can prevent "overlook" light from bypassing a primary and secondary mirror and directly entering the image plane or the corrector lenses near the image plane. Therefore, there is a need for integrated telescope designs that includes baffles into the optical components of the integrated telescope.

FIG. 1 shows one example of an integrated telescope without having movable or adjustable components in the optical layout of the telescope. As illustrated, the front, middle and rear optics pieces 110, 120 and 130 of a transparent material are designed to have geometries and shapes to include various optical components for the telescope and are permanently fixed to one another by adhesive or other means as a single integrated unit. The front optics piece 110 is designed to receive incoming light from the object or direction where images are captured. The rear optics piece 130 is fixed to the image sensor 150 that receives and detects the image formed by the telescope from the incoming light. The middle optics piece 120 as shown in this example is a flat slab having two opposing flat surfaces for engaging the front and rear optics pieces. These pieces 110, 120 and 130 can be symmetric around a common assembly symmetry axis as shown. The use of a common transparent material for the pieces 110, 120 and 130 can provide optical index match at an interface between these pieces to reduce optical loss due to reflection or distortion due to refraction and dispersion due to presence of different optical materials. Alternatively, different optical materials may be used for these pieces with desired index matching. The different pieces in the example in FIG. 1, e.g., the front, middle and rear optics pieces 110, 120 and 130, can be engaged together by a suitable technique, e.g., by using suitable adhesives or cements to engage two adjacent pieces in direct contact.

In FIG. 1, the middle optics piece 120 shown as a flat slab can be used to fine tune the distance between pieces 110 and 130 during assembly since after curing the adhesive the design cannot be adjusted. The distance between pieces 110 and 130 is selected to achieve a desired focal length or to achieve a desired distance between the primary and secondary mirrors of the telescope. During assembly, the middle flat slab piece 120 is selected from a set of flat plates of various thickness values so the selected piece has the desired thickness for the desired spacing between pieces 110 and 130. This design of using multiple pieces and the associated assembly process can provide cost reduction in comparison with a design based on a single piece material which requires expensive manufacturing process. Flat optical pieces of different thickness values can be obtained at relatively low costs in comparison with the front and rear pieces 110 and 130 that have mirrors of curved surfaces. For example, the cost of the flat middle piece 120 may be many times, e.g., 10, less expensive than the pieces 110 and 130.

In some implementations of the design in FIG. 1, if the front and rear optics pieces 110 and 130 can be made with sufficient accuracy, the front and rear optics pieces 110 and 130 may be directly engaged to each other without the middle piece 120 to achieve the desired focal length or to achieve a desired distance between the primary and secondary mirrors for the telescope in FIG. 1. Unless otherwise indicated, a surface described as concave or convex are from the point of view of the photons.

The front optics piece 110 includes a first surface on the left hand side and a second flat surface on the right hand side opposing the first surface. The first surface includes a convex reflector surface 111 with respect to the second flat surface within a central region of the front optics piece 110 and a peripheral ring shaped region that surrounds the central region for receiving input light. The rear optics piece 120 includes a first flat surface on its left hand side that is fixed to the middle optics piece 120 and a second, non-flat surface opposing the first flat surface. The second surface of the rear optics piece 130 includes a through hole in a central region of the rear optics piece 130 which is aligned to the central region of the front optics piece 110. The through hole exposes the central portion of the middle optics piece 110 where a correction lens 140 is fixed to the middle optics piece 120. The second surface of the rear optics piece 130 includes at least one concave reflector surface 131 with respect to its first flat surface that is fixed to the middle optics piece 120 and is located in a peripheral region surrounding the through hole of the rear optics piece 130. The convex reflector surface 111 of the front optics piece 110 and the concave reflector surface 131 of the rear optics piece 130 are configured to form an optical telescope that directs the input light received by the peripheral ring shaped region in the first surface of the front optics piece 110 along a folded optical path between the first surface of the front optics piece 110 and the second surface of the rear optics piece 130 to pass through the central region of the rear optics piece 130 to reach the image sensor 150. In this telescope, the concave reflector surface 131 is the primary reflector and the convex reflector surface 111 is the secondary reflector. The reflector surfaces 131 and 111 can be aspheric, e.g., a parabola or a hyperbola. The correction lens 140 provides certain optical corrections to the output light from the telescope. The correction lens 140 may be a single piece lens or a composite lens having two or more lens components. In the illustrated example, the correction lens 140 is located within the hole of the rear optics piece 130. In other implementations, the correction lens 140 may be at another location and fixed to the other optics. The image sensor 150 is fixed in position relative to the rear optics piece 130 at a focal plane of the optical telescope to receive and detect output light from the correction lens 140.

The adhesive layer for engaging the three optics pieces 110, 120 and 130 can be implemented with selective adhesive materials including some that can be UV cured. The index of refraction, the adhesive bonding strength and other material properties such as the thermal expansion coefficient and outgassing property should meet the requirements of the operation conditions of the telescope. Optically, the index refraction of the adhesive should match that of the optics pieces 11, 120 and 130. For space-related applications, the bonding strength of the adhesive layer should be sufficient to withstand the g-force experienced by the telescope in deployment. One example of commercial adhesive materials is Norland optical adhesive NOA88.

Figure 2:
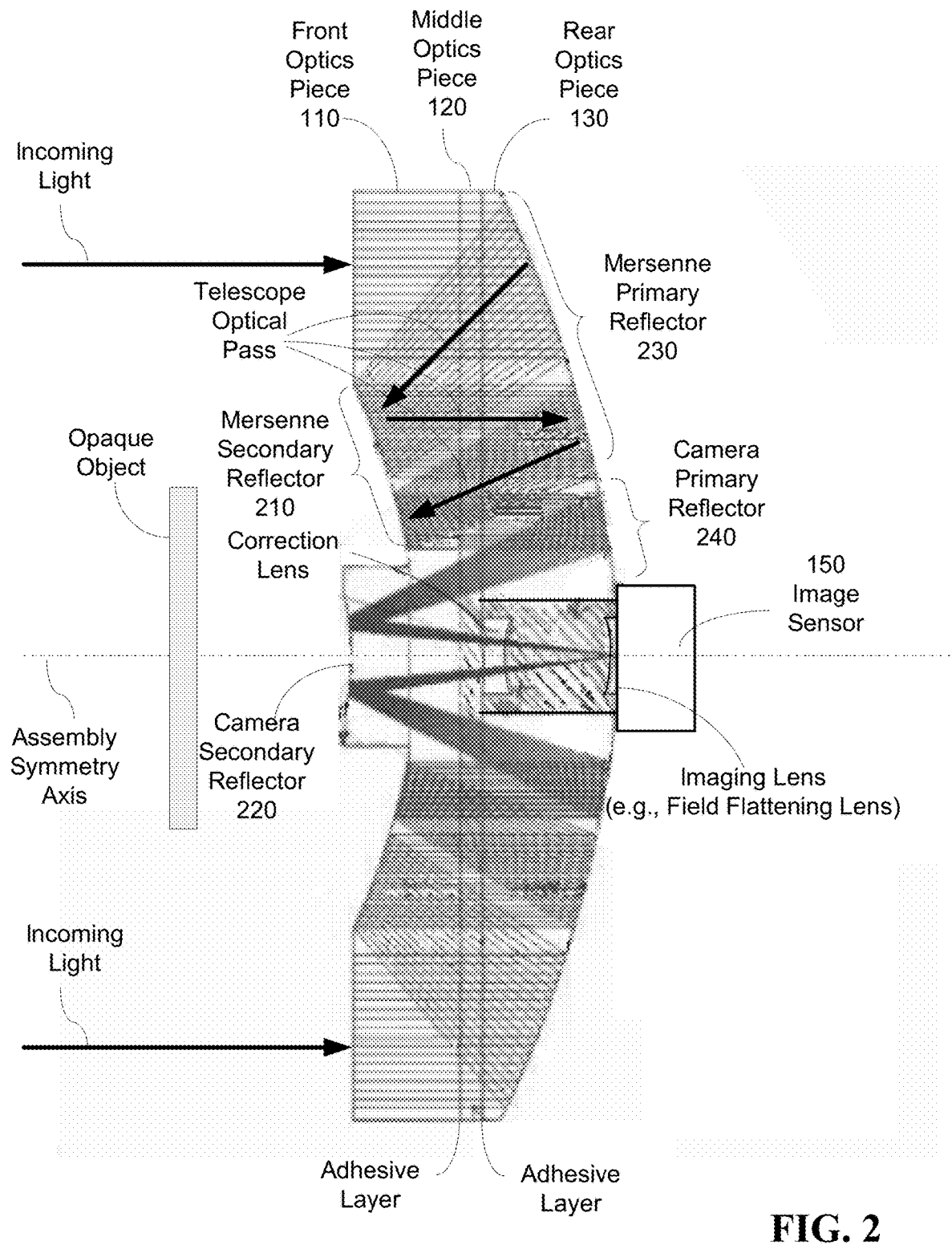

The integrated property of the telescope without movable or adjustable optical components in FIG. 1 can be used to construct more sophisticated telescopes. FIG. 2 shows an example of integrated telescope assembly that cascades two telescopes in series along the folded optical path between the front and rear optics pieces 110 and 130.

In FIG. 2, the front surface on the left hand side of the front optics piece 110 is structured to provide at least two convex reflector surfaces 210 and 220. Similarly, the rear surface on the right hand side of the rear optics piece 130 is structured to include at least two concave reflector surfaces 230 and 240. The convex reflector surface 220 is between the convex reflector surface 210 and the central region of the front optics piece 120. The concave reflector surface 240 is located in the peripheral region between the concave reflector surface 230 and the through hole in the central region of the rear optics piece 130. In this example, the reflector surfaces 230 and 210 form a pair as a Mersenne telescope where both surfaces may be parabolas to minimize spherical aberrations, coma and astigmatism for the large field of view (FOV) (e.g., diffraction-limited up to 2.5 degrees for a 35-cm telescope in some implementations). More specifically, the reflector surfaces 230 and 210 can be confocal parabolas. In addition, this example in FIG. 2 shows that the Mersenne telescope is a double-pass telescope where incoming light is reflected by each of the two reflector surfaces 230 and 210 two times—effectively squaring the magnification of the two reflector surfaces 230 and 210. The telescope can also be designed to reflect incoming light more than two times in other implementations to further increase the effective magnification.

In addition, the reflector surfaces 240 and 230, which are downstream along the optical train of the system, form a second telescope that receives the output of the Mersenne telescope before directing the light to the correction lens and another imaging lens before the image sensor (which may be a field flattening lens). This second telescope provides additional focusing to the light. In comparison with FIG. 1, the structure in FIG. 2 is more complex since the presence of two different curved surfaces 230 and 240 on the rear surface of the rear optics piece 130 may require them to have different aspherical profiles due to different optical requirements of the two cascaded telescopes. Similarly, the two curved surfaces 210 and 220 on the left hand side of the front optics piece 110 may also require them to have different aspherical profiles. This need of different surface profiles can complicate the fabrication. The reflector surface 220 can be formed in the same material as an integral part on the left side (front surface) of the front optics piece 110. FIG. 2, however, shows a different implementation for the surface 220 where the surface of the central portion of the front optics piece 110 is a flat surface and another piece of the transparent optical material is fixed to the flat surface and is structured to provide the reflector surface 220.

In the designs in FIGS. 1 and 2 and others in this document, the central portion in front of the left hand side of the front optics piece 110 is not used to receive any incoming light due to the presence of the reflector surfaces 210, 220 in FIG. 2 and reflector surface 111 in FIG. 1. To reduce optical noise, an opaque object may be placed in the front to block incoming light in this central portion. As described in the example in FIG. 5, an opaque disk may be integrated to a baffle that encloses the entire telescope to provide this blocking function.

Figure 3:
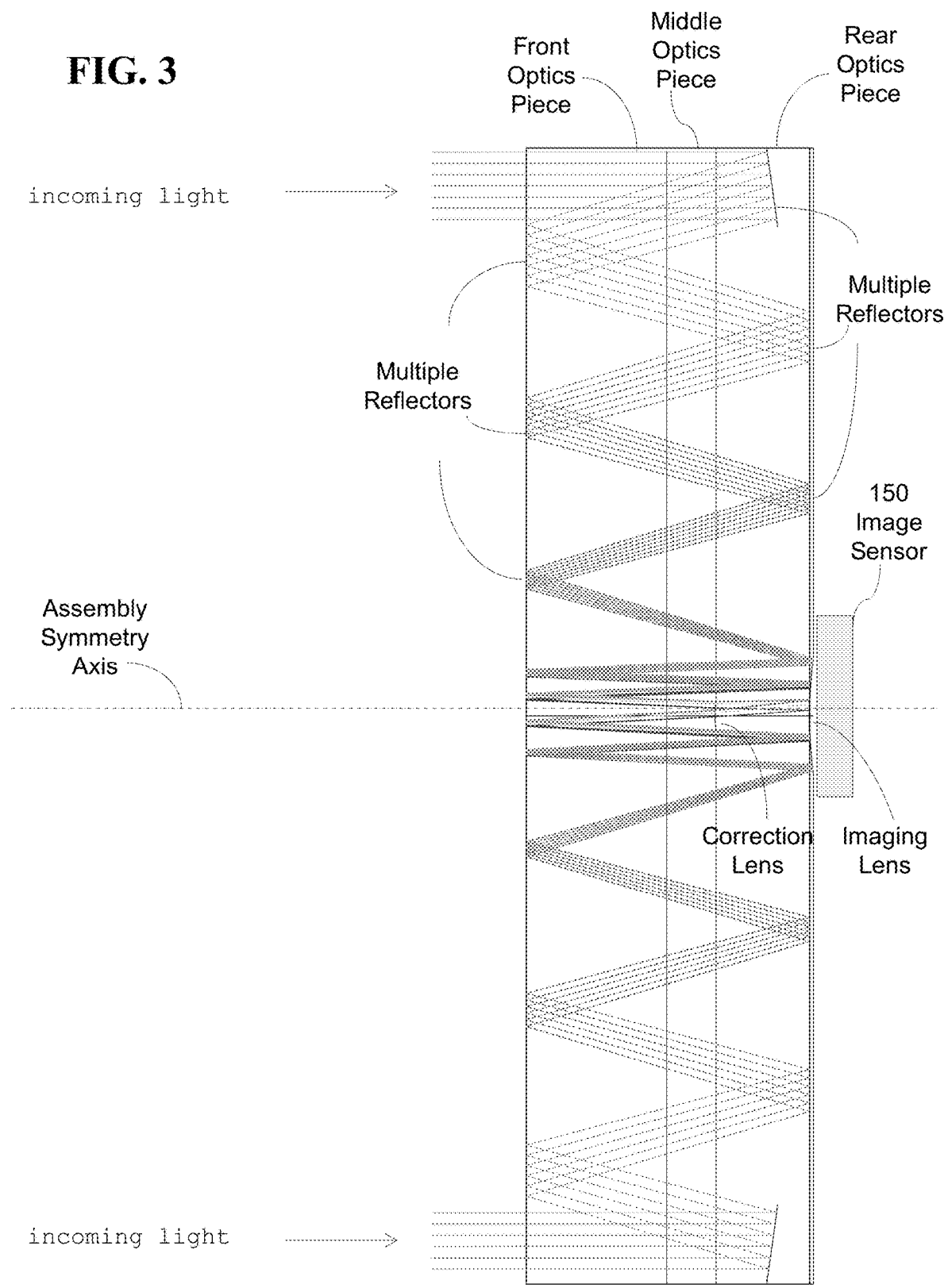

Turning now to FIG. 3, multiple reflectors can be provided in the front and rear optics pieces 110 and 130 to increase the number of reflections to increase the focal length of the telescope. Such designs of using additional reflections can maintain the relative compact size of the integrated telescope while increasing its focal length.

The image sensor 150 for capturing the output image of the telescope can be implemented by various image sensors. For example, the image sensor 150 can include a single image sensor array having image sensor pixels monolithically formed on a common chip or substrate, such as a CMOS sensor chip or a CCD sensor chip. The integrated telescope as disclosed here may have a relative large FOV, e.g., a target area of 5 km×5 km in an airborne or satellite platform where such an integrated telescope is deployed for monitoring ground targets or aerial regions. Depending on the actual spatial resolution required for the telescope images, this could lead to a large number of pixels in a single frame or scene in the telescope. Accordingly, a large sensor chip is needed to capture the image information. CMOS monolithic sensor arrays can be expensive as their sizes increase.

Alternatively, the image sensor 150 can be formed by using several small-size monolithic image sensor arrays that are placed at different locations at the imaging plane or focal plane of the system to capture different spatial portions of an image scene captured by the telescope, respectively. In this design, each of the sensor arrays captures only a portion of the entire image scene and the captured images from the different image sensor arrays can be digitally synthesized together to form the full image of the entire image scene captured by the telescope. This design can be a lower cost alternative to the single chip sensor.

Figure 4:
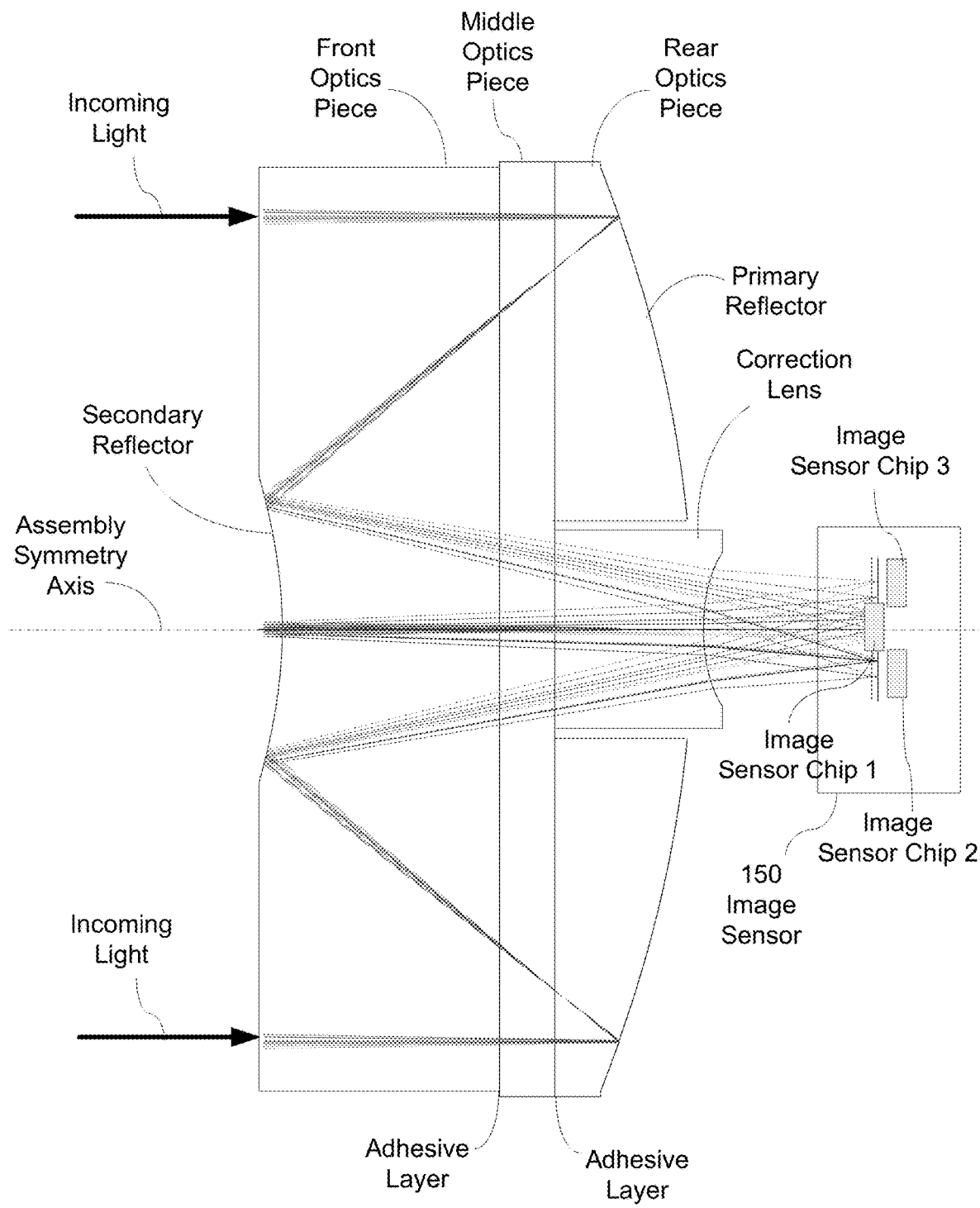
FIG. 4 shows an example of an integrated telescope assembly by permanently fixing optical components at pre-aligned positions where different image sensor chips are used to receive and detect different spatial portions of the image from the telescope, respectively.

The above multi-chip alternative design can be implemented by tiling the sensor chips together in a side by side manner within the same plane. In another implementation, referring to FIG. 4, the different image sensor chips 1, 2 and 3 can be used together without tiling located at different positions along an optical path of the light from the telescope (e.g., different chips are in different planes along the light propagation direction) in addition to being displaced in their location within the image plane for capturing different portions of the image scene. This is illustrated in FIG. 4. Notice that different sensor chips may have overlaps and this issue can be taken care of by digital synthesis of the images by remapping pixel readouts from the different sensor chips to a synthesized image display that represents the full image.

In various imaging applications, scattered light from a strong background can adversely affect or wash out the imaging contrast of the target area under imaging. For example, in imaging on a satellite or aircraft, sunlight is the dominating background. One way to mitigate such background issue is to implement a baffle structured to include a housing in which the integrated telescope unit is enclosed to block light from reaching the integrated telescope unit other than the front optics piece. The baffle includes a baffle front input port for receiving input light to reach the front optics pieces.

Figure 5:
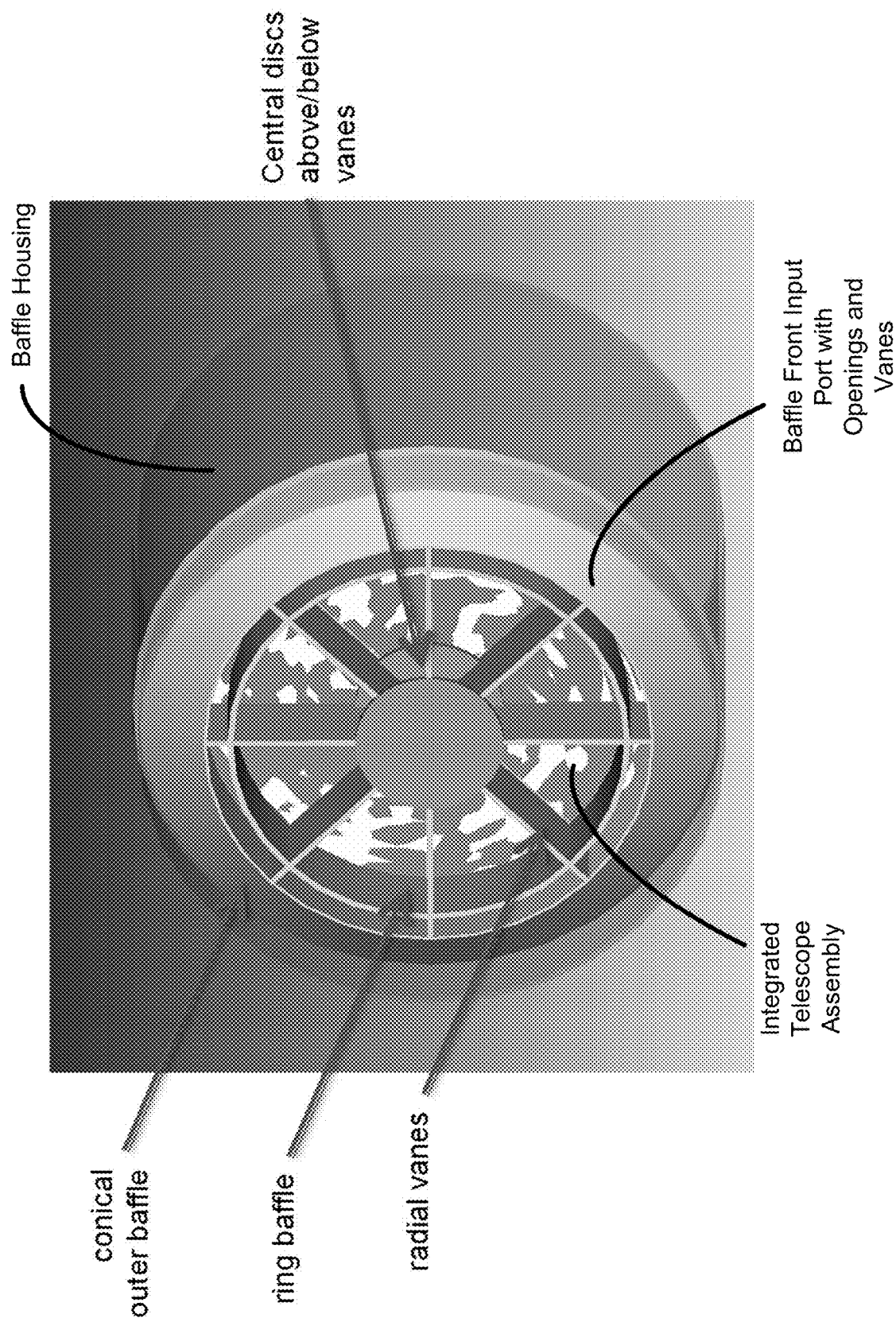
FIGS. 5, 6A and 6B illustrate a baffle mechanism for reducing adverse effect of scattered sunlight to the telescope operation.

This baffle design is shown in FIG. 5 where the baffle front input port includes vanes and sidewalls to reduce scattered sunlight from entering the integrated telescope unit. The vanes and sidewalls can be optically absorptive (e.g., blackened), optically retro-reflective, or optically diffractive (e.g., by including diffractive optical structures such as grooved structures to reduce the amount of the undesired scattered background light in the collected light at the image sensor 150 for imaging. In this example, the baffle front input port includes a front opening with radial vanes, a central disk module with a top disk above the vanes and a bottom disk below the vanes (closer to the input of the telescope underneath), and a ring baffle.

Figure 6A:
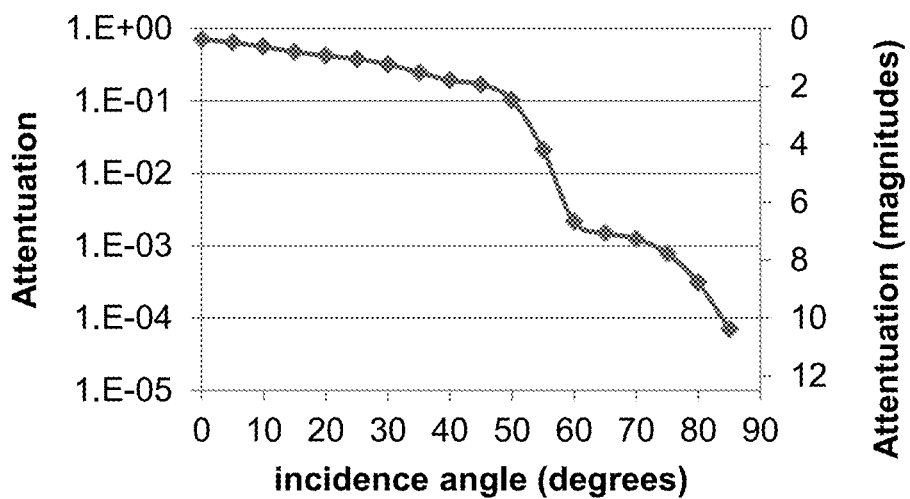

FIG. 6A show the light blocking effect by the baffle when the baffle surfaces are blackened to be optically absorptive where incident light with incident angles less than about 55 degrees can enter the telescope while light at larger angles is significantly attenuated. The telescope is oriented so that the sunlight is at large incidence angles. The scattered sunlight tends to be at large incident angles and thus is largely blocked out by the baffle.

Figure 6B:
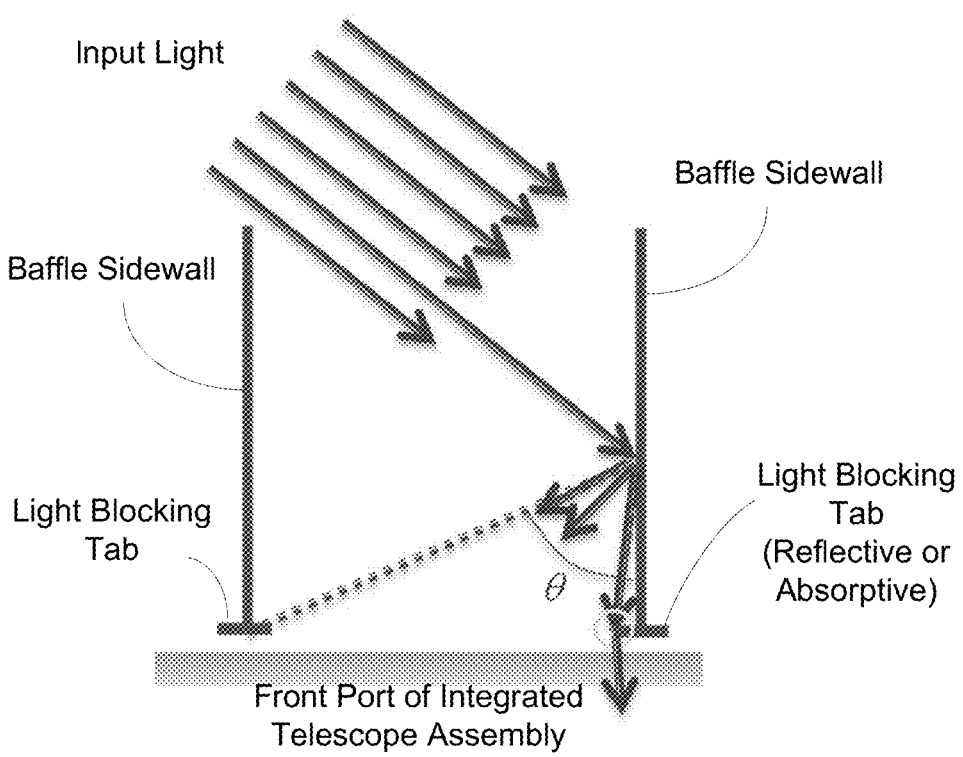

FIG. 6B shows a light blocking tab feature formed at the bottom of each sidewall in the baffle front input port to provide additional attenuation or blocking of scattered sunlight. For each sidewall of a vane or the ring baffle, an extension tab is formed at the bottom end of the sidewall above the integrated telescope unit and the extension tab is perpendicular to the sidewall. This extension tab can be optically absorptive (e.g., blackened) or optically reflective.

Figure 6C:
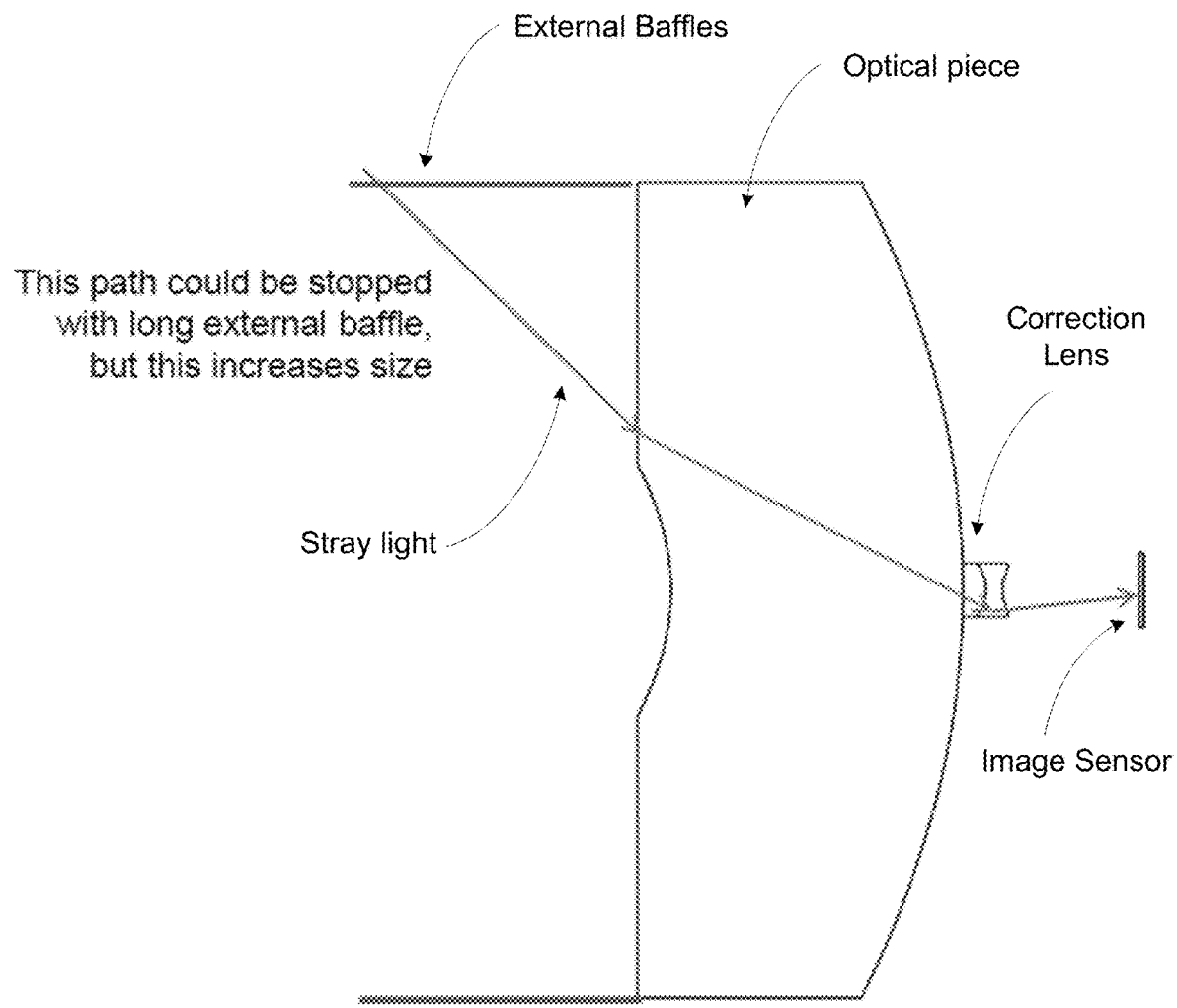
FIG. 6C shows that some stray light paths may be stopped with long external baffles.
Figure 6D:
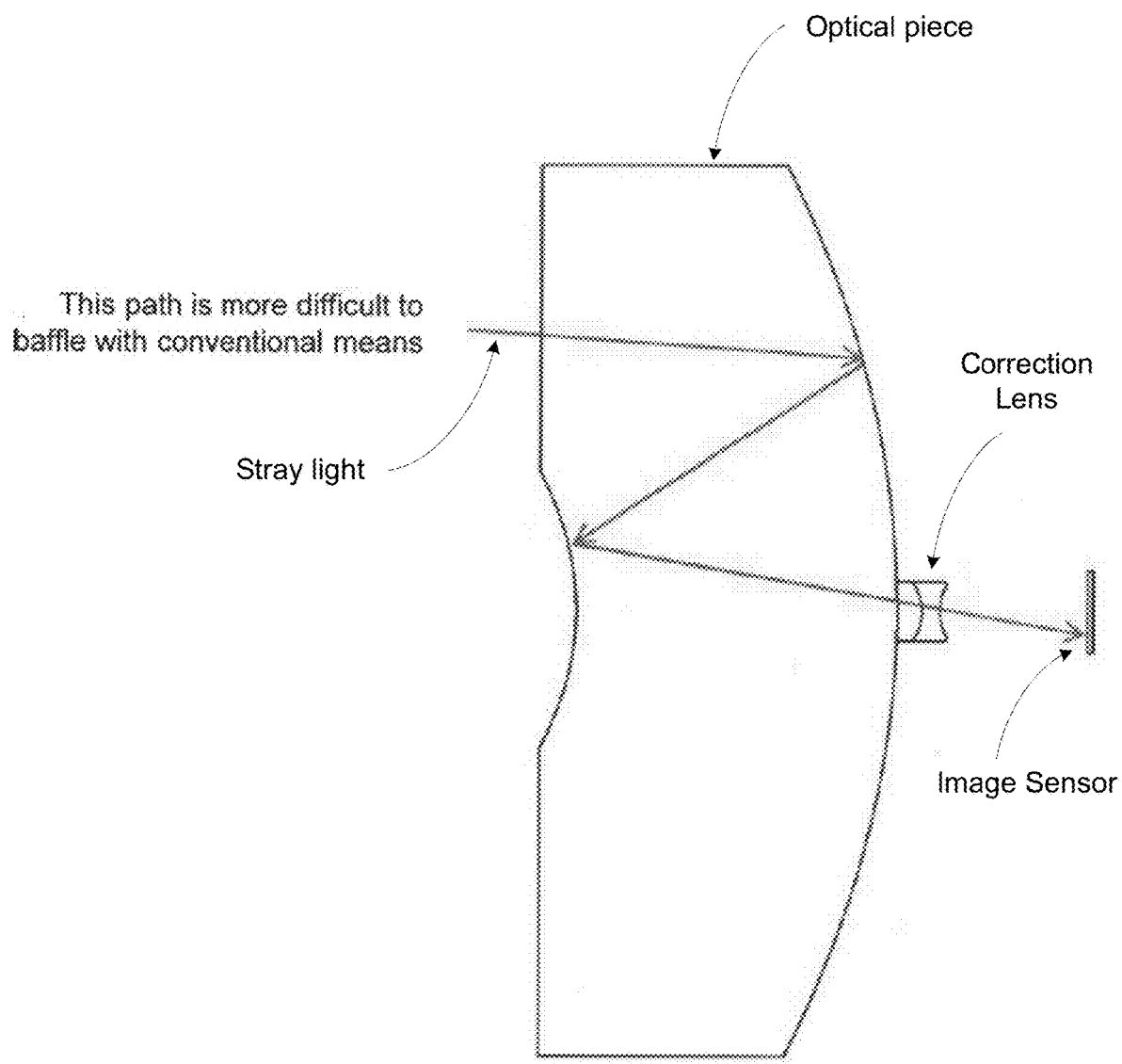
FIG. 6D shows that some stray light paths may be difficult to baffle with external baffles.

FIGS. 6C and 6D show that while external baffles formed outside the optical assembly of the integrated telescopes may block some stray light, such external baffles have some drawbacks in reducing the certain scattered background light. For example, FIG. 6C shows that some stray light paths of the background light may be stopped with long external baffles. However, long external baffles are not preferable because they increase the size of the integrated telescope and this is undesirable in certain applications such as telescopes mounted on satellites or aircraft where the real estate constitutes a premier in the overall platform engineering, manufacturing, and operation. In addition, external baffles formed outside the optical assembly of the integrated telescopes, due to their positions relative to the optical axis of the optical assembly of the integrated telescopes, may be limited their ability of blocking certain scattered background light with smaller entrance angles into the telescopes.

FIG. 6D shows that some stray light paths at smaller entrance angles may be difficult to stop with external baffles because the stray light enters the optics piece at small entrance angles without being absorbed or deflected away by the external baffles. In light of the integrated optical designs with optical components fixed in their relative positions as disclosed, one or more internal baffling features can be built inside the integrated optical designs by using interfaces between the fixed optical components to provide better blocking of the scattered background light.

Figure 7:
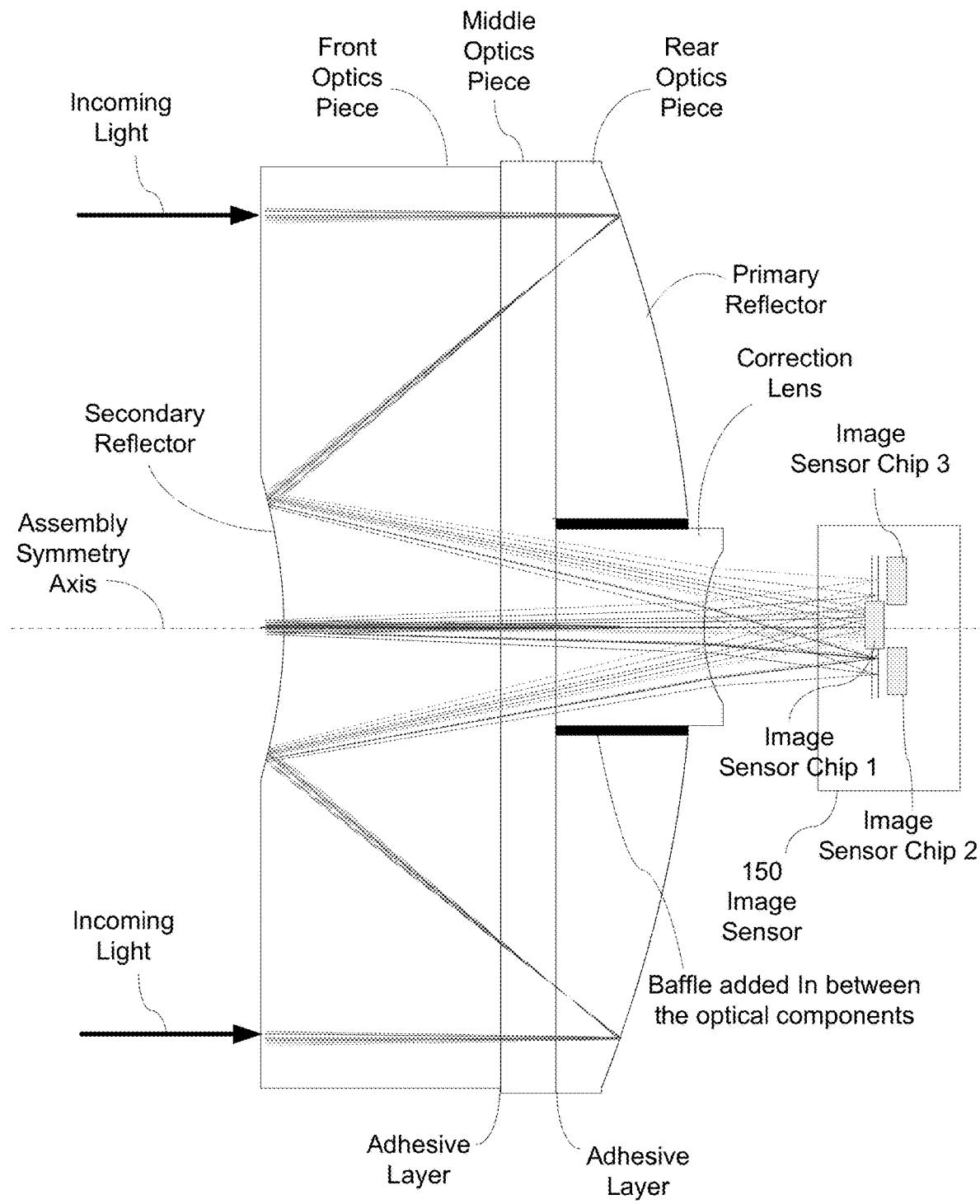
FIG. 7 shows an example of an integrated telescope assembly by permanently fixing optical components at pre-aligned positions where a baffle is added to the glass, and where different image sensor chips are used to receive and detect different spatial portions of the image from the telescope, respectively.

FIG. 7 shows one example of an internal baffling design that is built into the integrated optical assembly of a telescope previously shown in FIG. 4. Under this particular telescope design, the correction lens is located within the hole of the rear optics piece 130 and there is a natural space between the correction lens and the surrounding rear optics piece. This space can be in a cylindrical shape if the correction lens is shaped to have a circular cross section profile. Notably, this natural space between the correction lens and the surrounding rear optics piece can be used to form an internal baffle structure with a smaller optical aperture than the larger optical aperture formed by the receiving end of the front optics piece to block scattered background light for an enhanced optical imaging operation. This internal baffle structure between the correction lens and the surrounding rear optics piece can be optically absorptive (e.g., blackened), optically retro-reflective, or optically diffractive (e.g., by including diffractive optical structures such as grooved structures) to reduce the amount of the undesired scattered background light in the collected light at the image sensor 150 for imaging. In an exemplary embodiment, the area in between the correction lens and the rear optics piece includes a space or a moat that is filled with a material that forms the internal baffle structure. For example, the space or moat with the filled material may include a blackened curing material or a blackened epoxy. Such an internal baffle structure absorbs stray light and prevents the stray light from entering the image sensor 150. In some implementations, the filled material for forming the internal baffle structure may be index matched to the rear optics piece to avoid Fresnel reflections that would reflect certain scattered light into the image sensor 150 and allows the internal baffle structure to absorb undesired scattered background light at near-grazing incidence.

In some embodiments, the material for the internal baffle structure between the correction lens and the surrounding rear optics piece may include a mixture containing a blackening agent, such as a carbon black material or a powdered black spinel, or epoxy. The powdered black spinel may include Manganese Ferrite Black Spinel material or Ferro 6331-2. In some embodiments, the material for the internal baffle structure can be loaded with approximately 10 to 15% by weight of the blackening agent. The loading of the internal baffle structure with the blackening agent can be performed to maximize the amount of blackening agent in the baffle structure while allowing the epoxy to be cured. For example, for ultraviolet (UV) curing of the epoxy, the blackening agent mixed with the epoxy can also absorbs the UV light and can impede the curing. As an example, at approximately 10 to 15% by weight of the blackening agent, the curing of the epoxy mixed with the blackening agent took several days with a low power UV lamp of approximately six watts.

Figure 8:
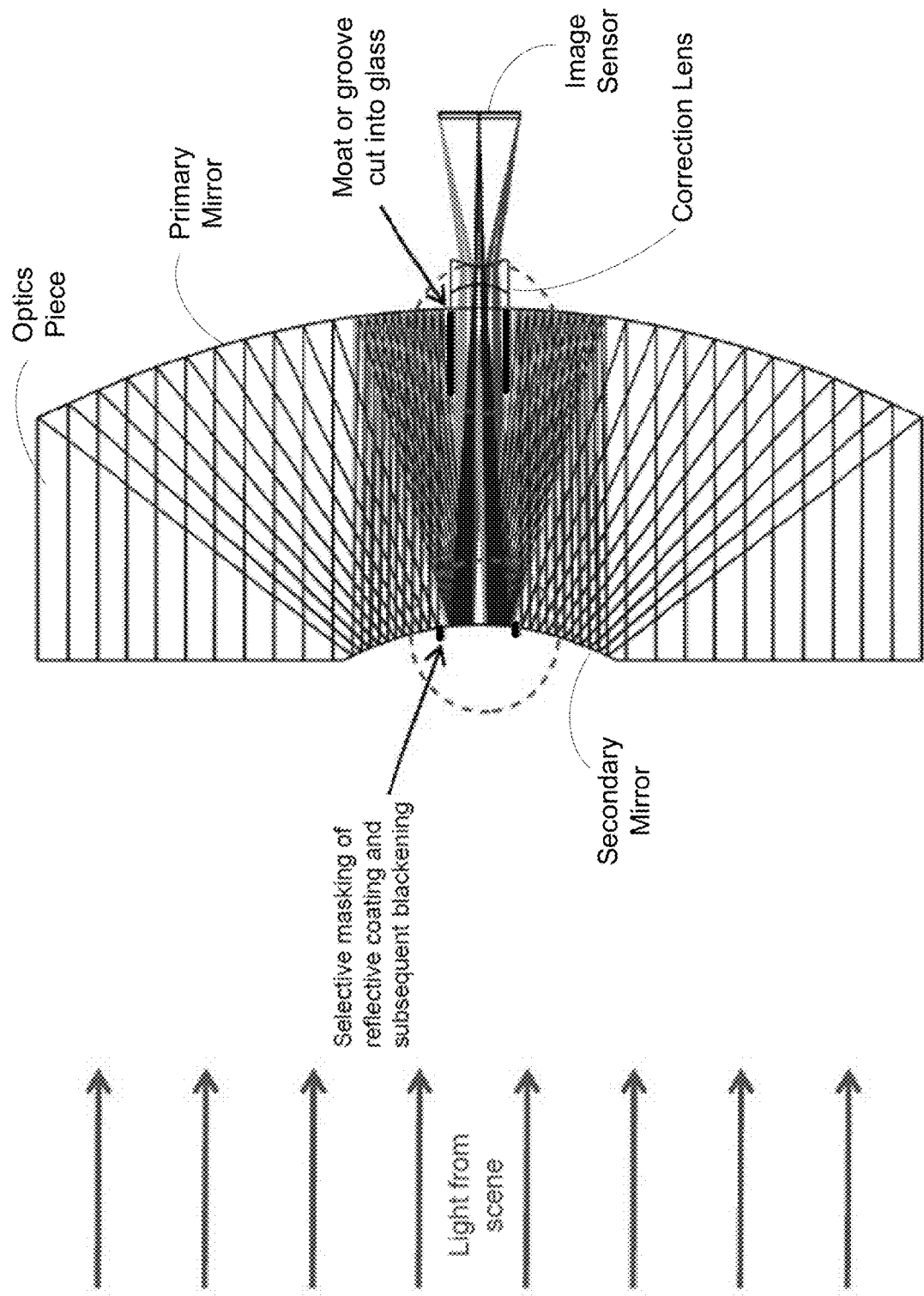
FIGS. 8-9 show an example of optical components with internal baffling.
Figure 9:
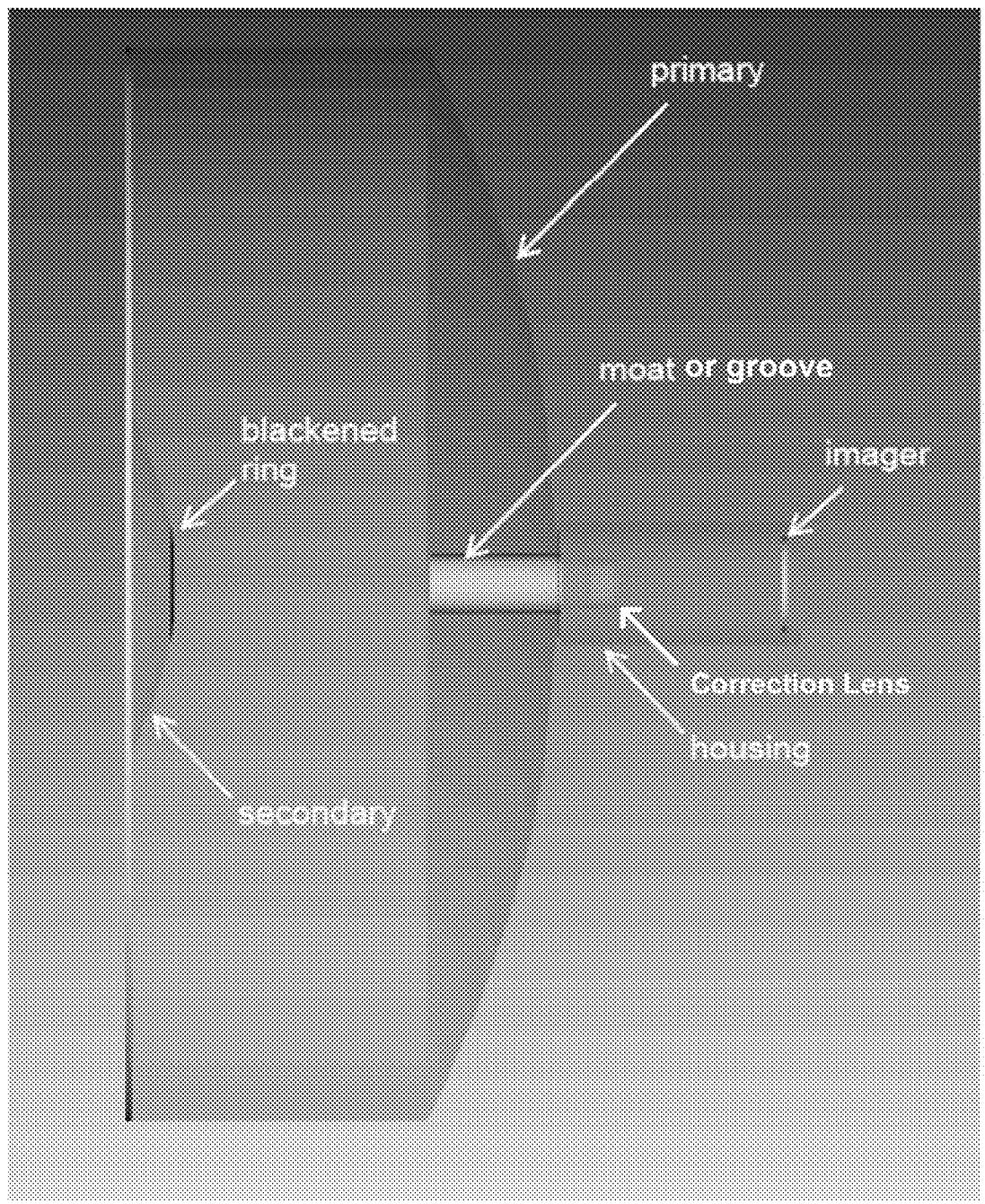

FIGS. 8 and 9 show another example of an internal baffle structure design that includes an additional light blocking feature as a ring surrounding the secondary reflector that is optically upstream from the correction lens, where a moat or groove is cut into the optics piece and filled with a baffle. The optics piece is formed of a transparent optical material and having a first surface and a second surface opposing the first surface. In some embodiments, the optics piece of FIG. 8 may be different from the optics piece described in FIG. 7. For example, the optics piece of FIG. 8, 9, 11, 12, or 13 may be manufactured from a single solid glass structure or a single monolithic optics piece with desired optical properties. Using a single solid glass structure can lead to several benefits such as having an economical system that is robust to a wide variety of environments, including large temperature changes or g-forces resulting from a rocket launch. Furthermore, the compact nature of the single solid glass structure allows for a low moment of inertia, which enables high slew-rate applications. In some implementations, the solid glass structure may be manufactured of a transparent material. Further, the solid glass structure may include a primary concave mirror on one side of the solid glass structure and a secondary convex mirror on another side of the solid glass structure and opposite to the primary concave mirror. A surface of the solid glass structure that includes the secondary convex mirror is designed to receive incoming light from the object or direction where images are captured. In the particular example specifically shown in FIG. 8, a correction lens is provided between the optical piece and the image sensor to direct the collected light rays onto the image sensor. In operation, the incoming light reflects off from both the primary and secondary mirrors to be received by the image sensor through the correction lens. As shown in FIGS. 8 and 9, the first surface includes a secondary mirror and the second surface includes a primary mirror. The first surface includes a convex reflector surface within a central region of the optics piece and a peripheral ring shaped region that surrounds the central region for receiving input light.

In the design in FIGS. 8 and 9, the second surface includes a concave reflector surface located in a peripheral region surrounding the cylindrical groove in the second surface. The convex reflector surface of the first surface and the concave reflector surface of the second surface are configured to form an optical telescope that directs the input light received by the peripheral ring shaped region in the first surface along a folded optical path between the first surface and the second surface to pass within the cylindrical groove of the second surface. The secondary mirror and the primary mirror of the solid glass structure are configured to form an optical telescope that directs the input light received by the peripheral ring shaped region in the first surface of the solid glass structure along a folded optical path between the first surface and the second surface to pass through the central region of the solid glass structure to reach the image sensor. The primary and secondary mirrors can be in different optical designs and, in some implementations, they can be aspheric, e.g., a parabola or a hyperbola.

As shown in FIGS. 8 and 9, the second surface that includes the primary mirror also includes a cylindrical groove with a predetermined depth that extends towards the first surface in the central region of the optics piece. In some embodiments, the depth of the groove can be as large as possible without cutting off light from the scene, such as either the light that is headed towards the image sensor after the last reflection, or the light that reflects off the primary mirror for the last time and is headed towards the secondary mirror. The cylindrical groove is structured to include an internal baffle structure as described above for FIG. 7. In some embodiments, this internal baffle structure may have approximately the same or similar index of refraction as the index of refraction of the optics piece to avoid Fresnel reflections that would reflect overlook light into the image sensor. In some embodiments, the index matching of this internal baffle structure with the surrounding optics allows the baffle to absorb light at near-grazing incidence. In an exemplary embodiment, this internal baffle structure may include a blackened epoxy. In another embodiment, this internal baffle structure may include carbon black material. In another embodiment, the baffle includes powered black spinel, such as manganese ferrite black spinel.

FIGS. 8 and 9 also show that selected parts of the secondary mirror may optionally include a blackening agent to further block stray light. For example, the optics piece may include baffle structures such as one or more rings on a portion of the convex reflector surface of the first surface. The one or more rings may be black to absorb stray or overlook light reflected onto the secondary mirror. In some embodiments, the secondary mirror may include more than one ring formed in a concentric pattern, where the rings may be black. In some embodiments, one or more rings may also be included on a portion of the concave reflector surface of the second surface. The one or more rings may be black to absorb stray or overlook light received by the primary mirror. In some embodiments, the surface that includes the primary mirror may include more than one ring formed in a concentric pattern, where the rings may be black. A benefit of having more than one ring is that it can block light that the baffle structure may not be able to block without cutting off light from the scene. In some embodiments, one or more rings may also be included on the front aperture of the optics piece that receives incoming light. A benefit of including the one or more rings on the front aperture of the optics piece is that it can block certain stray light that the other measures, such as the baffle structure, may not be able to block.

In the example in FIGS. 8 and 9, the correction lens and the image sensor are placed behind the optical piece so that the correction lens optically modifies the light rays from the optical piece and projects the light rays onto the image sensor. The correction lens is structured to provide certain optical corrections to the output light from the telescope. The correction lens may be a single piece lens or a composite lens having two or more lens components. In some embodiments, the correction lens may be located adjacent to the cylindrical groove of the second surface to receive output light from the cylindrical groove. In other implementations, the correction lens may be at another location and fixed to the other optics. In some embodiments, the image sensor is fixed in position relative to the second surface of the optics piece at a focal plane of the optical telescope to receive and detect output light from the correction lens. As shown in FIG. 9, a sensor housing structure may be provided to enclose the correction lens and the image sensor and is located adjacent to a central region of the optics piece next to the primary mirror. The sensor housing receives the light that passes through the cylindrical groove of the second surface, through the correction lens, and directs it to the image sensor or the imager.

Figure 10:
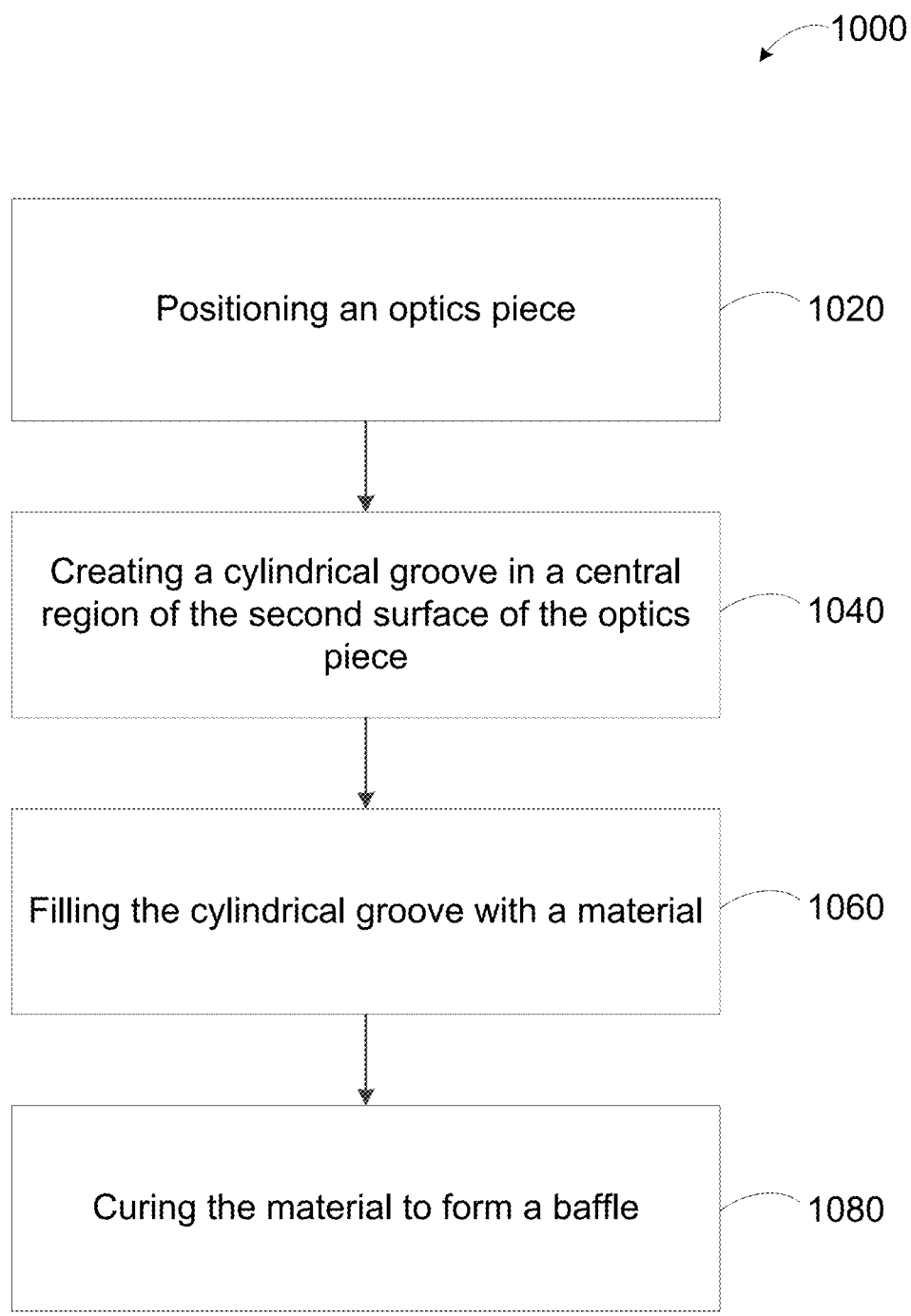
FIG. 10 shows an exemplary method of forming an integrated baffle.

FIG. 10 shows an exemplary method 1000 for forming an integrated baffle in or on an optical component. In the positioning operation 1020, an optics piece is positioned so that the first surface of the optics piece faces away from the hole saw and the second surface of the optics pieces faces towards the hole saw. The optics piece may be positioned on a milling machine. In the drilling operation 1040, a cylindrical groove is created in a central region of the second surface of the optics piece. The drilling operation is performed by plunging a bit, such as a diamond hole saw, into the optics piece to a predetermined depth. The bit may be cooled with a coolant and the drilling operation may be performed with many short plunges into the optics piece to keep the bit from overheating. In some embodiments, the cylindrical groove may have a width of approximately 1 millimeter corresponding to a kerf of the bit. Next, in the filling operation 1060, the cylindrical groove is filled with a material that forms a baffle. Subsequently, in the curing operation 1080, the baffle is cured using ultra-violet light.

In some embodiments, the cylindrical groove is filled from bottom of the cylindrical groove with a vibrating syringe to avoid air bubbles. One benefit of the filling the groove from the bottom with a vibrating syringe is that it avoids air bubbles and ensures that the groove is completely wetted out.

In some embodiments, the baffle has approximately the same or similar index of refraction as the index of refraction of the optics piece. In some embodiments, the baffle is a blackened epoxy. In some embodiments, the baffle includes carbon black material. In some embodiments, the baffle includes powdered black spinel, such as manganese ferrite black spinel.

The exemplary method of adding a baffle to an optical component also includes adding one or more rings to either the primary mirror, or the secondary mirror, or both the primary and the secondary mirrors. For example, a method for adding one of more rings to the first surface, such as a secondary mirror, includes performing the following method. First, one or more ring shaped masks is placed over a portion of a convex reflector surface of the first surface. Next, a reflective coating is deposited on the first surface of the optics piece. Subsequently, the one or more ring shaped masks is removed from the convex reflector surface of the first surface to expose the one or more ring regions without the reflective coating. Next, a black material is applied to the one or more rings regions. In some implementations, the drilling operation 1040 of FIG. 10 may be performed either before or after the depositing of the reflective coating. In some implementations, the filling operation 1060 of FIG. 10 may be performed after the depositing of the reflective coating to avoid contaminating the chamber that may deposit the reflective coating or to avoid any effects on the baffle structure from the high temperature of the coating chamber. In some embodiments, the black material may have a same or similar index of refraction as the index of refraction of the optics piece. In some embodiments, may include carbon black material. In some embodiments, the black material includes powdered black spinel, such as manganese ferrite black spinel.

In another example, a method for adding one of more rings to the first surface, such as a primary mirror, includes the same method and the same materials used to form one or more rings on the secondary mirror as described above.

Figure 11:
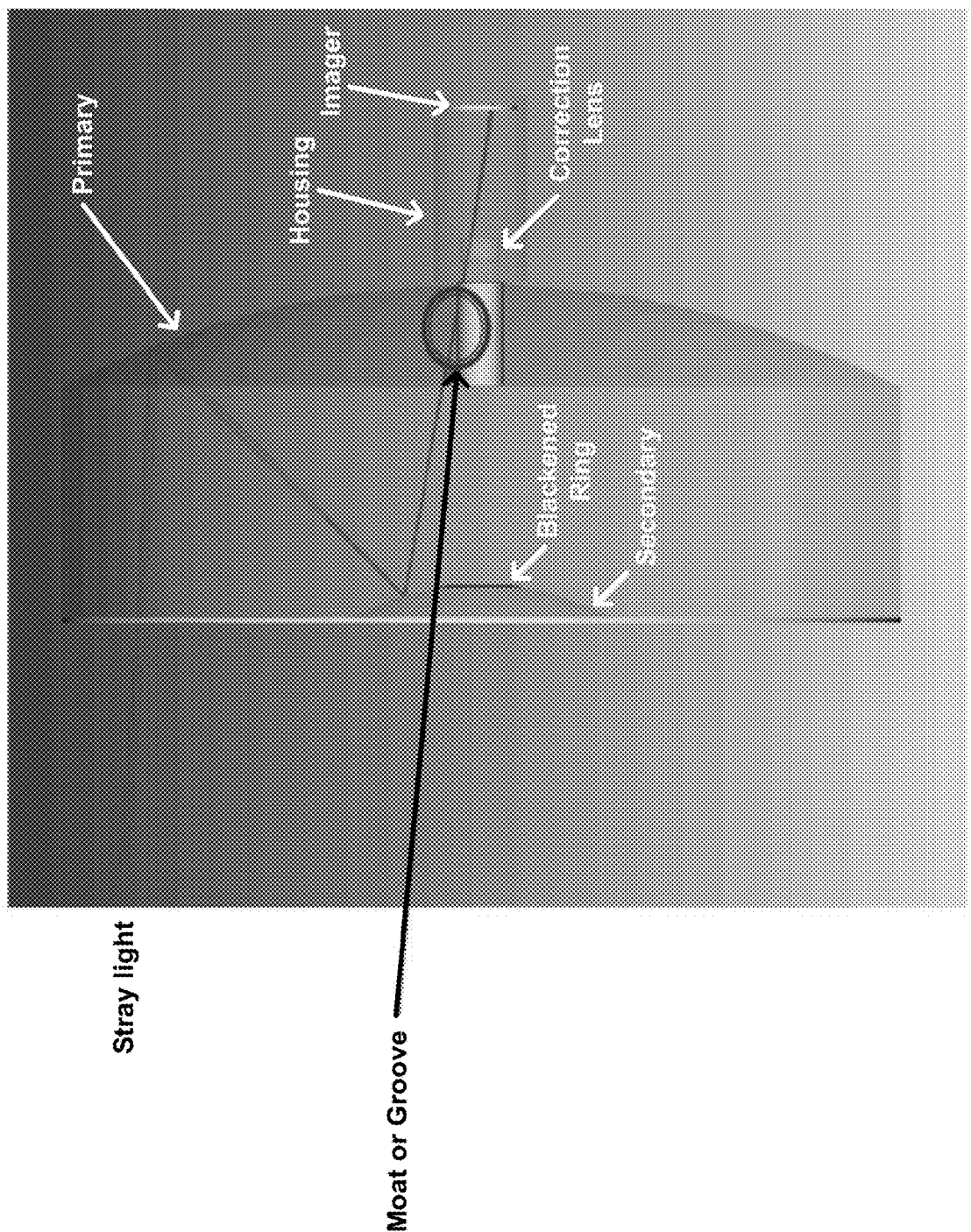
FIG. 11 shows an exemplary baffle in the second surface blocking stray light.

FIG. 11 shows an exemplary baffle in the second surface blocking stray light. In an exemplary embodiment, the baffle blocks stray light (shown by the circle on the baffle) from approximately 2.8 degrees to 5.0 degrees. This is the angle of light that arrives at the telescope approximately 2.8 degree to 5.0 degree off-axis. Without the baffle the stray light can reach the imager after only two reflections and can swamp the image signal by about four times. Without the exemplary baffle, the stray light can reach the image sensor after two reflections and can swamp the signal received by the image sensor by about a factor of four at least because the stray light may exceed by a factor of four the light received from the scene and the stray light may reduce the contrast of the image. For different implementations of the optics and baffle structure, the angle may be different.

Figure 12:
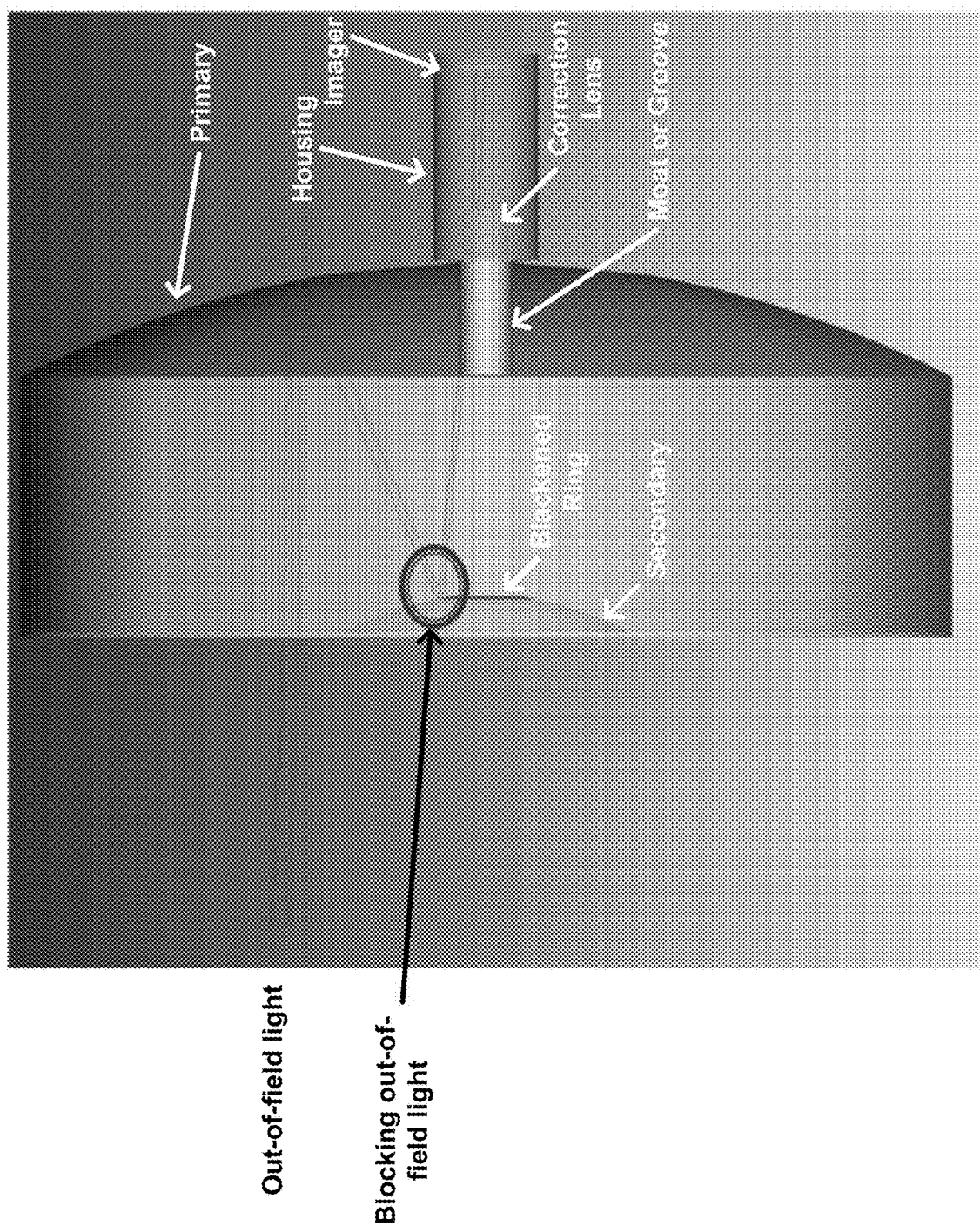
FIG. 12 shows an exemplary baffle or blackened ring in the first surface blocking stray light.

FIG. 12 shows an exemplary baffle or blackened ring in the first surface blocking stray light. In an exemplary embodiment, the blackened ring on the secondary mirror can block stray light from approximately 1.0 degrees to 2.8 degrees. One benefit of the one or more blackened rings is that it may block out out-of-field light without vignetting the scene.

Figure 13:
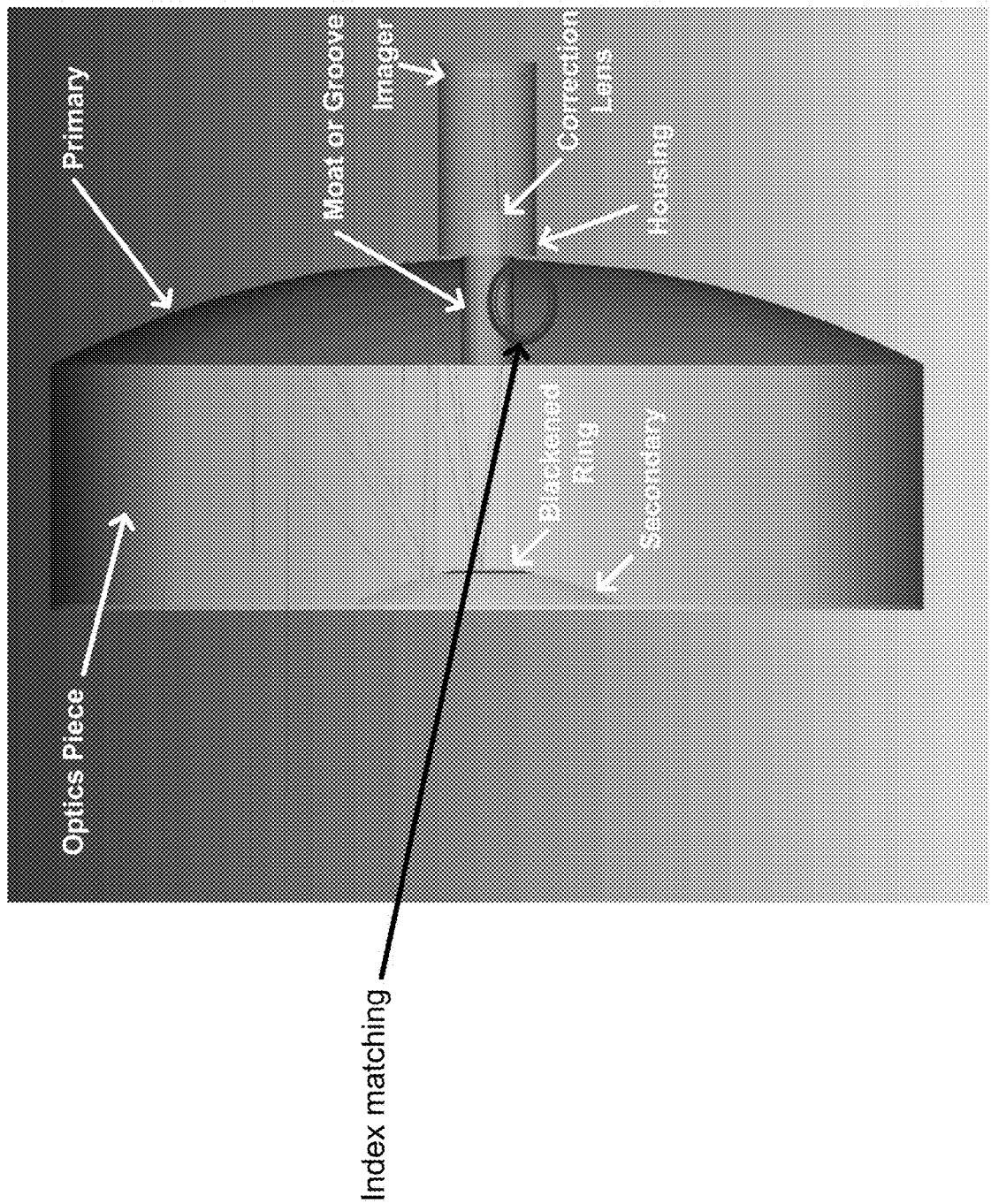
FIG. 13 shows exemplary index-matched baffles on the first and second surface.

FIG. 13 shows exemplary index-matched baffles in the optics piece. For example, as shown in FIG. 13, index-matching the baffle in the primary or second surface prevents Fresnel reflections from a baffle region that interfaces with the optics piece. In some embodiments, the index of refraction of the baffle can be the same as the index of refraction of the optics piece. In an exemplary embodiment, index-matched buffer, such as a blackened epoxy, absorbs light and prevents reflections from approximately 0.5 degrees to 1.0 degrees.

The exemplary integrated baffles disclosed in FIGS. 7-13 can also be added to the optics pieces described in FIGS. 1-3. Further, in an exemplary embodiment, external baffles may be added to an integrated telescope for the exemplary optics pieces with the integrated baffles as discussed in FIGS. 7-13. Exemplary external baffles are described in FIG. 5. In some embodiments, the external baffles include front baffles, rear baffles, or both front and rear baffles.

The above described integrated telescope designs can be used for providing telescopic imaging on a satellite or a moving platform due to their compact size, resistance of the optical alignment to shocks and vibrations, and their improved ability of blocking scattered background light. An integrated telescope assembly is mounted on a satellite or a moving platform by permanently fixing optical components at predefined positions without having movable or adjustable components in the integrated telescope assembly. The integrated telescope assembly includes front, middle and rear optics pieces of a transparent material, a correction lens and an image sensor that are permanently fixing to one another in an integrated packaging. A satellite equipped with such an integrated telescope assembly can be used to provide ground surveillance while the satellite is orbiting. A satellite equipped with such an integrated telescope assembly can be used to monitor upcoming objects or space debris in the space on or around the satellite orbit to collect data on presence of such objects or space debris or to avoid collision.

The integrated telescope designs described in this patent document can be used with Short-Wave Infrared (SWIR) imaging technology for various applications, such as surveillance or reconnaissance from Unmanned Aerial Vehicles (UAVs) or small satellites, agriculture and irrigation assessment, utilities inspection, or border patrol. For such applications, conventional SWIR optical systems that use refractive or reflective telescopes are prone to misalignments, as explained above, and are often bulky in size to achieve the desired aperture size and focal length. With the advent of small and relatively inexpensive platforms, such as drones or CubeSats, there is a need for smaller and more robust SWIR systems that can be installed on these small platforms. As further described below, the optical components described in FIGS. 7-9 and 11-13 can be designed with structural or material properties that can be suitable for compact SWIR imaging application.

Figure 14:
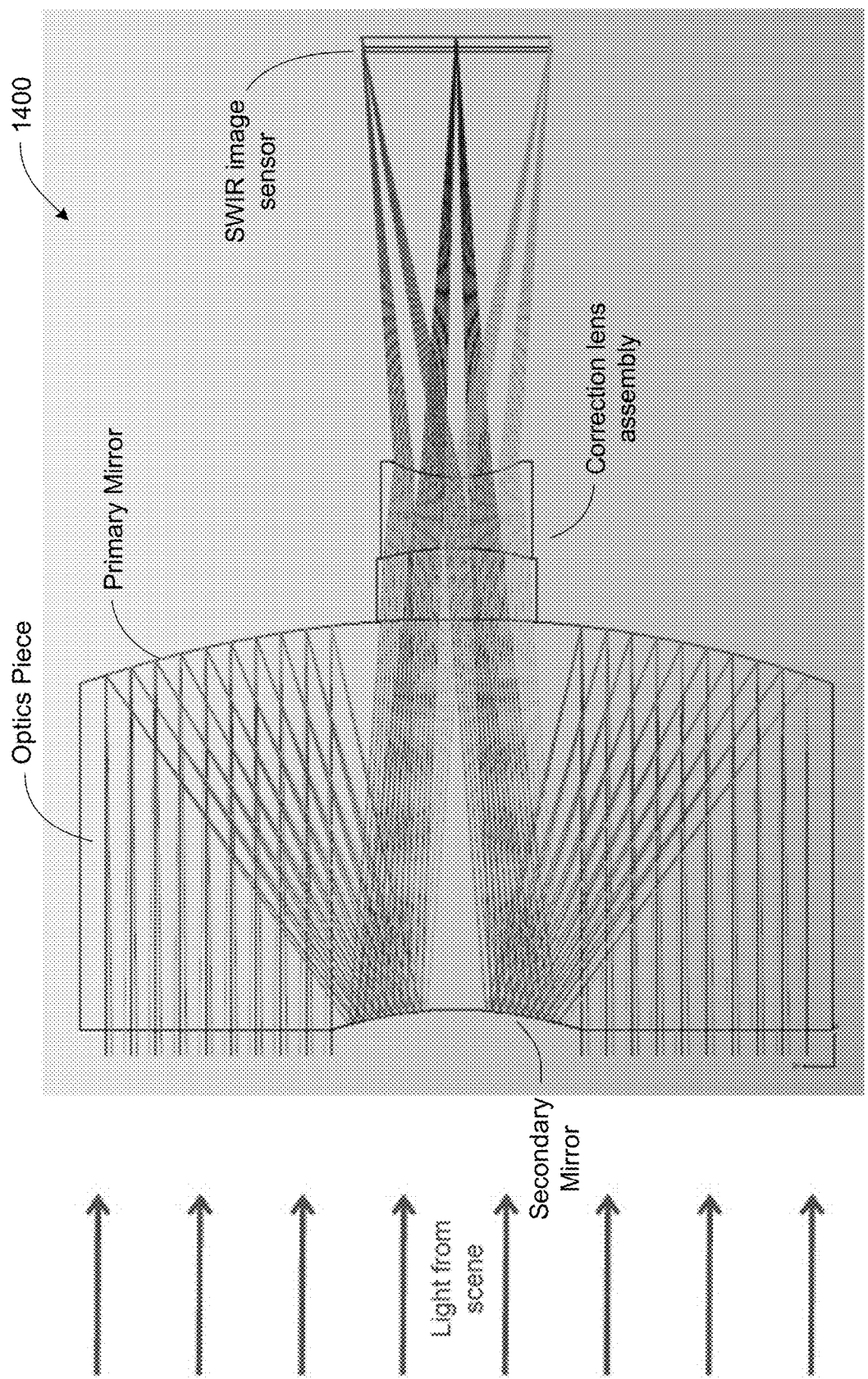
FIG. 14 shows an example of optical components designed without baffling for a Short-Wave Infrared (SWIR) system.

FIG. 14 shows an example of optical components designed without baffling for a SWIR system 1400. The SWIR system 1400 includes an optics piece that can be manufactured from a single solid glass structure or a single monolithic optics piece with desired optical properties. A first surface of the optics piece includes a convex reflector surface within a central region of the optics piece, also known as a secondary mirror, and a peripheral ring-shaped region that surrounds the central region for receiving input light. A second surface of the optics piece includes a primary mirror. The optics piece is formed of a transparent optical material and has a primary concave mirror on one side of the solid glass structure and a secondary convex mirror on another side of the solid glass structure and opposite to the primary concave mirror. The primary and secondary mirrors can have different optical designs and, in some implementations, they can be aspheric, e.g., a parabola or a hyperbola.

The primary and secondary mirrors may be coated with materials to improve SWIR imaging. The coating materials may include a metallic coating, such as silver or gold that reflects well in the SWIR band. The coating may also be a dielectric multi-layer coating designed for high-reflectivity in the SWIR band. In some configurations, the peripheral ring need not be coated, as its losses can be relatively small (approximately 4%). A typical anti-reflective coating can reduce those losses to approximately 1% or less. In some embodiments, a coating on the peripheral ring surface may be used to filter wavelengths. The peripheral ring is a convenient place to position a filter without introducing additional surfaces for filtering.

The SWIR system 1400 includes a correction lens assembly located in between the optical piece and the SWIR image sensor to direct the collected and corrected light rays onto the SWIR image sensor. The correction lens assembly may be located adjacent to the central region of the second surface and is structured to provide certain optical corrections to the output light from the telescope. For example, the correction lens can be designed to correct the field aberrations and chromatic aberrations in the SWIR band. In general, the lens can be designed to provide corrections for a desired range of wavelength, including but not limited to, the visible band. The correction lens assembly may have only spherical surfaces to focus light onto the SWIR image sensor. The convex reflector surface of the first surface and the concave reflector surface of the second surface are configured to form an optical telescope that directs the input light received by the peripheral ring-shaped region in the first surface along a folded optical path between the first surface and the second surface to pass through a central region of the second surface through the correction lens assembly and onto the SWIR image sensor. The correction lens assembly may be a single piece or a composite lens having two or more lens components. The correction lens assembly may also use radiation hardened glass to allow the SWIR system to provide imaging in radiation environments, such as in space.

The SWIR system 1400 also includes SWIR image sensor with an InGaAs array or any other suitable sensor array material to provide sensitivity in the SWIR range. In some embodiments, the SWIR image sensor can receive light rays having wavelength from 900 nm to 1700 nm, inclusive. In some embodiments, the SWIR image sensor is fixed in position relative to the second surface of the optics piece at a focal plane of the optical telescope to receive and detect output light from the correction lens assembly. A sensor housing structure (not shown in FIG. 15, but shown in FIG. 9) may be provided to enclose the correction lens assembly and the SWIR image sensor, and is located adjacent to a central region of the optics piece next to the primary mirror. The sensor housing accommodates the sensor and receives the light that passes through the central region of the second surface and through the correction lens assembly.

Figure 15:
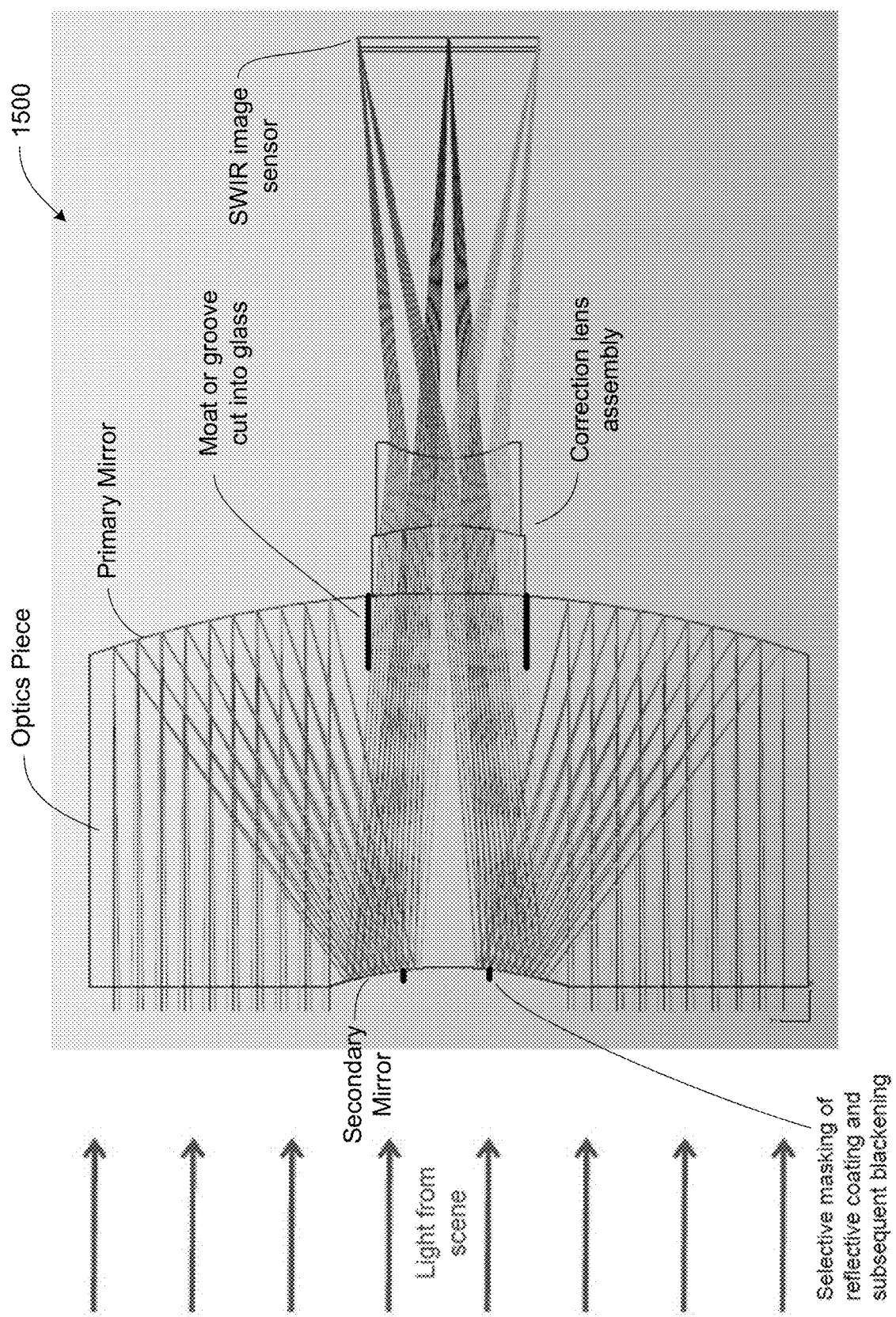
FIG. 15 shows an example of optical components including baffling for a Short-Wave Infrared (SWIR) system.

FIG. 15 shows an example of optical components including baffling for an SWIR system 1500. The features associated with the optics piece, primary and secondary mirrors, peripheral ring-shaped region, correction lens assembly, sensor housing structure, and SWIR image sensor are described earlier in this patent document. In addition, the second surface of the optics piece can include a cylindrical groove or moat with an internal baffle structure to block stray light as described in this patent document for FIGS. 7-13. The secondary mirror of the optics piece can optionally include a baffle structure such as one or more rings that include a blackening agent to further block stray light as described in this patent document for FIGS. 8-9. In some embodiments, the one or more rings (e.g., one or more black rings) may also be included on a portion of the concave reflector surface of the second surface or on a portion of the convex reflector surface of the first surface, as is further described in this patent document.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:
1. A telescope, comprising:
an optics piece formed of a transparent optical material and including a first surface and a second surface opposing the first surface,
wherein the first surface includes a convex reflector surface within a central region of the optics piece and a peripheral ring shaped region that surrounds the central region for receiving input light received by the telescope,
wherein the second surface includes a cylindrical groove and a concave reflector surface located in a peripheral region surrounding the cylindrical groove, the cylindrical groove structured to have a predetermined depth, to include a baffle and to extend towards the first surface in the central region of the optics piece, and
wherein the convex reflector surface of the first surface and the concave reflector surface of the second surface are configured to collectively form an optical telescope that directs the input light received by the peripheral ring shaped region of the first surface along a folded optical path between the first surface and the second surface to pass within the cylindrical groove of the second surface;
a correction lens located adjacent to the cylindrical groove of the second surface to receive output light from the cylindrical groove; and an image sensor fixed in position relative to the second surface of the optics piece at a focal plane of the optical telescope to receive and detect output light from the correction lens.

2. The telescope of claim 1, wherein the baffle has an index of refraction that is approximately the same as an index of refraction of the optics piece.

3. The telescope of claim 1, wherein the baffle includes a blackened epoxy, a carbon black material, or a powdered black spinel.

4. The telescope of claim 3, wherein the powdered black spinel includes a manganese ferrite black material.

5. The telescope of claim 1, further comprising:
one or more rings on a portion of the convex reflector surface of the first surface.

6. The telescope of claim 5, wherein the one or more rings is black.

7. The telescope of claim 1, further comprising:
multiple rings formed on a portion of the convex reflector surface of the first surface and arranged in a concentric pattern.

8. The telescope of claim 1, further comprising:
one or more rings on a portion of the concave reflector surface of the second surface.

9. The telescope of claim 8, wherein the one or more rings is black.

10. The telescope of claim 1, further comprising:
multiple rings formed on a portion of the concave reflector surface of the second surface and arranged in a concentric pattern.

11. A method for adding a baffle to an optical component, comprising:
positioning an optics piece such that a first surface of the optics piece faces away from a hole cutting device and a second surface of the optics piece faces towards the hole cutting device;
creating a cylindrical groove in a central region of the second surface of the optics piece by plunging the hole cutting device into the optics piece to a predetermined depth;
filling the cylindrical groove with a material to form a baffle;
placing one or more ring shaped masks over a portion of a convex reflector surface of the first surface;
depositing reflective coating on the first surface of the optics piece;
removing the one or more ring shaped masks from the convex reflector surface of the first surface to expose the one or more ring regions without the reflective coating; and
applying a black material to the one or more rings regions.

12. The method of claim 11, wherein the cylindrical groove is filled from bottom of the cylindrical groove with a vibrating syringe to avoid air bubbles.

13. The method of claim 11, wherein the baffle has an index of refraction that is approximately same as an index of refraction of the optics piece.

14. The method of claim 11, wherein the baffle includes a blackened epoxy, a carbon black material, or a powdered black spinel.

15. The method of claim 11, wherein the black material applied to the one or more rings regions has an index of refraction that is approximately same as an index of refraction as the optics piece.

16. The method of claim 11, wherein the black material applied to the one or more rings regions includes a carbon black material or a powdered black spinel.

17. The method of claim 11, further comprising:
placing one or more ring shaped masks over a portion of a concave reflector surface of the second surface;
depositing reflective coating on the second surface of the optics piece;
removing the one or more ring shaped masks from the concave reflector surface of the second surface to expose the one or more ring regions without the reflective coating; and
applying a black material to the one or more rings regions.

18. A telescope, comprising:
an optics piece formed of a transparent optical material and including a first surface and a second surface opposing the first surface,
wherein the first surface includes a convex reflector surface within a central region of the optics piece and a peripheral ring shaped region that surrounds the central region to receive input light received by the telescope,
wherein the convex reflector surface of the first surface and a concave reflector surface of the second surface are configured to collectively form an optical telescope that directs the input light received by the peripheral ring shaped region in the first surface along a folded optical path between the first surface and the second surface; and
a correction lens located adjacent to the second surface to receive output light from the optics piece to apply an optical correction thereto,
wherein the optics piece is structured to include an internal optical baffle located inside the optics piece in the folded optical path between the first surface and the second surface to reduce scattered background light in the output light received by the correction lens.

19. The telescope of claim 18, wherein:
the internal optical baffle includes a cylindrical structure in the folded optical path near the second surface to allow light to pass within the cylindrical structure towards the correction lens while blocking light that hits a side of the cylindrical structure.

20. The telescope of claim 19, wherein:
the internal optical baffle is optically absorptive, optically retro-reflective, or optically diffractive.

21. The telescope of claim 20, wherein:
the optically diffractive internal optical baffle includes a grooved structure.

22. The telescope of claim 18, wherein the internal optical baffle has an index of refraction that is approximately same as an index of refraction of the optics piece.

23. The telescope of claim 18, wherein the internal optical baffle includes a blackened epoxy, a carbon black material, or a powdered black spinel.

24. The telescope of claim 18, further comprising:
a short-wave infrared image sensor fixed in position relative to the second surface of the optics piece at a focal plane of the optical telescope to receive and detect output light from the correction lens.

25. The telescope of claim 24, wherein the convex and concave reflector surfaces include a metallic coating or a dielectric multi-layer coating.

26. The telescope of claim 24, wherein the short-wave infrared image sensor is configured to receive light having wavelength from 900 nm to 1700 nm.

27. The telescope of claim 18, further comprising:
one or more rings on a portion of the convex reflector surface of the first surface.

28. The telescope of claim 27, wherein the one or more rings is black.

29. The telescope of claim 18, further comprising:
one or more rings on a portion of the concave reflector surface of the second surface.

30. The telescope of claim 29, wherein the one or more rings is black.

* * * * *